United States Patent
Elder et al.

(10) Patent No.: US 7,834,583 B2
(45) Date of Patent: Nov. 16, 2010

(54) REMOTELY CONTROLLED MULTIPLE BATTERY SYSTEM

(75) Inventors: David Elder, Margate, FL (US); Frank Bruno, Lake Worth, FL (US)

(73) Assignee: Reserve Power Cell, LLC, Deerfield Beach, FL (US)

( * ) Notice: Subject to any disclaimer, the term of this patent is extended or adjusted under 35 U.S.C. 154(b) by 0 days.

(21) Appl. No.: 12/149,950

(22) Filed: May 9, 2008

(65) Prior Publication Data
US 2008/0315837 A1    Dec. 25, 2008

Related U.S. Application Data

(60) Division of application No. 10/708,739, filed on Mar. 22, 2004, now Pat. No. 7,388,349, which is a continuation-in-part of application No. 10/604,703, filed on Aug. 11, 2003, now Pat. No. 7,339,347.

(51) Int. Cl.
*H02J 7/00* (2006.01)
*H02H 7/18* (2006.01)

(52) U.S. Cl. ............... 320/104; 320/103; 320/126; 307/10.7

(58) Field of Classification Search ............... 320/103, 320/104, 126; 307/10.7
See application file for complete search history.

(56) References Cited

U.S. PATENT DOCUMENTS

| | | |
|---|---|---|
| 1,588,803 A | 6/1926 | Owen |
| 3,029,301 A | 4/1962 | Strider |
| 3,200,014 A | 8/1965 | Roberts |
| 3,475,221 A | 10/1969 | Jordan et al. |
| 3,742,302 A | 6/1973 | Neill |
| 3,758,345 A | 9/1973 | Toth et al. |
| 3,763,415 A | 10/1973 | Ownby |
| 4,041,363 A | 8/1977 | Sheidler |
| 4,082,992 A | 4/1978 | Day |

(Continued)

FOREIGN PATENT DOCUMENTS

DE       3502100 A1    7/1986

(Continued)

OTHER PUBLICATIONS

Hardin, J.E., Laboratory Testing of GNB Switch 12 Volt SLI Battery, Mar. 1990, pp. 1-16, U.S. Department of Commerce, National Technical Information Service, Springfield, VA.

(Continued)

*Primary Examiner*—Edward Tso
*Assistant Examiner*—Richard V Muralidar
(74) *Attorney, Agent, or Firm*—Tangent Law Group, PLLC; Eric J. Weierstall, esq.

(57) ABSTRACT

A remotely controllable multiple battery system for reliably supplying electrical energy to an electrical system, the remotely controllable multiple battery system receiving control signals from a remote control device, the remotely controllable multiple battery system having a remotely controlled controller. An at least one sensor that senses the condition of a main battery and an at least one controlled switching device coupled remotely to the controller and responding to a signal from the remote control device to the controller thereby switching from the main battery to an at least one auxiliary battery.

16 Claims, 16 Drawing Sheets

U.S. PATENT DOCUMENTS

| | | | |
|---|---|---|---|
| 4,090,122 A * | 5/1978 | Hoinski | 320/125 |
| 4,157,492 A | 6/1979 | Colbrese | |
| 4,239,839 A | 12/1980 | McDowall et al. | |
| 4,489,242 A | 12/1984 | Worst | |
| 4,516,066 A | 5/1985 | Nowakowski | |
| 4,684,580 A | 8/1987 | Cramer | |
| 4,746,853 A | 5/1988 | Ingalls | |
| 4,869,688 A | 9/1989 | Merio | |
| 4,883,728 A | 11/1989 | Witehira | |
| 4,924,176 A | 5/1990 | Tremblay | |
| 4,949,028 A | 8/1990 | Brune | |
| 5,002,840 A | 3/1991 | Klebenow et al. | |
| 5,108,848 A * | 4/1992 | Kramer | 429/9 |
| 5,154,985 A | 10/1992 | Tanaka | |
| 5,157,271 A | 10/1992 | Fujiwara | |
| 5,162,164 A | 11/1992 | Dougherty et al. | |
| 5,162,720 A * | 11/1992 | Lambert | 320/104 |
| 5,164,273 A | 11/1992 | Szasz et al. | |
| 5,169,735 A | 12/1992 | Witehira | |
| 5,175,484 A | 12/1992 | Witehira et al. | |
| 5,194,799 A | 3/1993 | Tomantschger | |
| 5,200,688 A * | 4/1993 | Patino et al. | 320/104 |
| 5,204,610 A | 4/1993 | Pierson et al. | |
| 5,223,351 A | 6/1993 | Wruck | |
| 5,225,761 A | 7/1993 | Albright | |
| 5,256,502 A | 10/1993 | Kump | |
| 5,264,777 A | 11/1993 | Smead | |
| 5,316,868 A | 5/1994 | Dougherty et al. | |
| 5,352,966 A | 10/1994 | Irons | |
| 5,418,444 A | 5/1995 | Cook et al. | |
| 5,448,152 A | 9/1995 | Albright et al. | |
| 5,487,956 A | 1/1996 | Bromley et al. | |
| 5,496,654 A | 3/1996 | Perkins | |
| 5,549,984 A | 8/1996 | Dougherty | |
| 5,576,612 A | 11/1996 | Garrett et al. | |
| 5,666,040 A | 9/1997 | Bourbeau | |
| 5,683,827 A | 11/1997 | Yu | |
| 5,694,335 A | 12/1997 | Hollenberg | |
| 5,726,553 A | 3/1998 | Waugh | |
| 5,767,658 A | 6/1998 | Hayes | |
| 5,825,100 A | 10/1998 | Kim | |
| 5,838,136 A | 11/1998 | Waugh | |
| 5,844,325 A | 12/1998 | Waugh et al. | |
| 5,866,274 A | 2/1999 | Mawston et al. | |
| 5,907,194 A | 5/1999 | Schenk et al. | |
| 5,986,431 A | 11/1999 | Hayes | |
| 5,993,983 A | 11/1999 | Rozon | |
| 5,995,396 A * | 11/1999 | Byrne et al. | 363/89 |
| 6,005,367 A | 12/1999 | Rohode | |
| 6,046,514 A | 4/2000 | Rouillard et al. | |
| 6,051,976 A | 4/2000 | Bertness | |
| 6,057,666 A | 5/2000 | Dougherty et al. | |
| 6,121,750 A | 9/2000 | Hwa et al. | |
| 6,172,478 B1 | 1/2001 | Leppo et al. | |
| 6,181,100 B1 | 1/2001 | Shoji | |
| 6,198,249 B1 | 3/2001 | Kroll et al. | |
| 6,222,341 B1 | 4/2001 | Dougherty et al. | |
| 6,222,342 B1 | 4/2001 | Eggert et al. | |
| 6,229,279 B1 | 5/2001 | Dierker | |
| 6,271,642 B1 | 8/2001 | Dougherty et al. | |
| 6,275,001 B1 | 8/2001 | Dierker | |
| 6,320,351 B1 * | 11/2001 | Ng et al. | 320/104 |
| 6,323,608 B1 | 11/2001 | Ozawa | |
| 6,377,029 B1 | 4/2002 | Krieger et al. | |
| 6,384,573 B1 | 5/2002 | Dunn | |
| 6,452,361 B2 * | 9/2002 | Dougherty et al. | 320/104 |
| 6,455,951 B1 | 9/2002 | Shultz et al. | |
| 6,456,036 B1 | 9/2002 | Thaniwe | |
| 6,476,583 B2 | 11/2002 | McAndrews | |
| 6,507,169 B1 | 1/2003 | Holtom et al. | |
| 6,515,453 B2 | 2/2003 | Feil et al. | |
| 6,545,445 B1 * | 4/2003 | McDermott et al. | 320/103 |
| 6,577,098 B2 | 6/2003 | Griffey et al. | |
| 6,597,150 B1 | 7/2003 | Bertness et al. | |
| 6,639,384 B2 | 10/2003 | Hasegawa et al. | |
| 6,727,602 B2 | 4/2004 | Olson | |
| 6,734,651 B2 | 5/2004 | Cook et al. | |
| 6,832,171 B2 | 12/2004 | Berslykov | |
| 6,923,279 B2 | 8/2005 | Shimane et al. | |
| 6,936,934 B2 * | 8/2005 | Morimoto et al. | 307/9.1 |
| 7,042,115 B2 * | 5/2006 | Mizutani et al. | 307/10.1 |
| 7,058,525 B2 | 6/2006 | Bertness et al. | |
| 7,129,706 B2 | 10/2006 | Kalley | |
| 2003/0062773 A1 | 4/2003 | Richter et al. | |
| 2004/0078141 A1 | 4/2004 | Kittell et al. | |
| 2004/0113589 A1 | 6/2004 | Crisp et al. | |
| 2004/0192407 A1 | 9/2004 | Formenti | |
| 2006/0284600 A1 | 12/2006 | Verbrugge | |
| 2007/0159137 A1 | 7/2007 | Verburgee et al. | |
| 2007/0285060 A1 | 12/2007 | Zettel et al. | |

FOREIGN PATENT DOCUMENTS

| | | |
|---|---|---|
| EP | 1355401 A2 | 10/2003 |
| GB | 2040117 A | 8/1980 |
| GB | 2220112 | 12/1989 |
| GB | 2373648 A | 9/2002 |
| JP | 05068306 A | 3/1993 |
| JP | 2001021974 A | 1/2001 |
| WO | WO/02/42766 | 5/2002 |
| WO | WO2007006121 | 1/2007 |

OTHER PUBLICATIONS

Halverson, Richard C., Neon Colors Jazz Up APAA Show 'Spare' Batteries Spark Interest Despite High Prices, Sep. 25, 1989, Discount Store News (via www.findarticles.com).

Pacific Dunlop of Austrailia, Exide Switch Battery "The others look half as good", Jul. 3, 1989, pp. 1-2.

Machine translation of JP-05068306, 1993.

Office action in connection with co-pending, related U.S. Appl. No. 12/149,950 dated May 11, 2009 (12 pages).

SAFT/VALEO Power Point Presentation "Ni-MH/Lead Acid dual battery system: A reliable solution for energy demanding vehicles", presented at the Advanced Automotive Battery Conference, Jul. 13, 2004.

"Revolutionary New 'Intelligent Dual Battery System' Introduced to Market", Press Release, Reeves-Laverdure, Aug. 26, 2004.

"RPC Intelligent Dual Battery System", Advanced Battery Technology, Sep. 2004, vol. 40: No. 9, p. 18.

"Dual Battery Always Delivers", Battery & EV Technology, Aug. 2004.

"New Intelligent Dual Battery System Introduced into the Market", Battery Power Products & Technology, Sep. 2004, vol, 8, Issue 5.

Patent Office of the People's Republic of China; Notification and English translation of a First Office Action dated Oct. 10, 2008 in connection with Chinese Application No. 200480026280.8 entitled "Multiple Battery SystemManagement System, Auxilary Battery Attachment System" (5 pages), which is a Chinese counterpart application to parent U.S. Appl. No. 10/604,703.

Schmidt, et al: "Complex Impedance Studies of Lithium Iodine Batteries", Aerospace and Electronic Systems Magazine, IEEE, Aug. 1990, vol. 5, Issue 8, pp. 7-12.

Unknown, 'Spare' Battery Prices Ease at Discounters, Jan. 29, 1990, Discount Store News (reprinted at www.findarticles.com).

Unknown, *Tomorrow's World The Australian Initiative Early Innovations in Transport*, http://apc-online.com/twa/history3.html, Associated Publishing Corporation, As cited in parent case, presented in IDS on Apr. 26, 2006 and printed from the internet on Apr. 4, 2006.

Unknown, Exide Switch featuring Pulsar Technology, Jul. 3, 1989 (USPTO Date Stamp—cited in parent application).

Rong, et al: "An Analytical Model for Predicting the Remaining Battery Capacity of Lithium for Batteries", Proceedings of the Design, Automation and Test in Europe Conference and Exhibition, 2003, pp. 1148-1149.

Patent Office of the People's Republic of China; Notification and English transtation of a Second Office Action dated May 8, 2009 in connection with Chinese Application No. 200480026280.8 entitled "Multiple Battery SystemManagement System, Auxilary Battery Attachment System" (5 pages), which is a Chinese counterpart application to parent U.S. Appl. No. 10/604,703.

http://www.iqpower.com/iqp_english/content/iqtechnologie/einblock/aussehen.html As cited in parent case, presented in IDS on Jan. 10, 2005.

http://www.odysseyfactory.com/default.htm As cited in parent case, presented in IDS on Jan. 10, 2005.

* cited by examiner

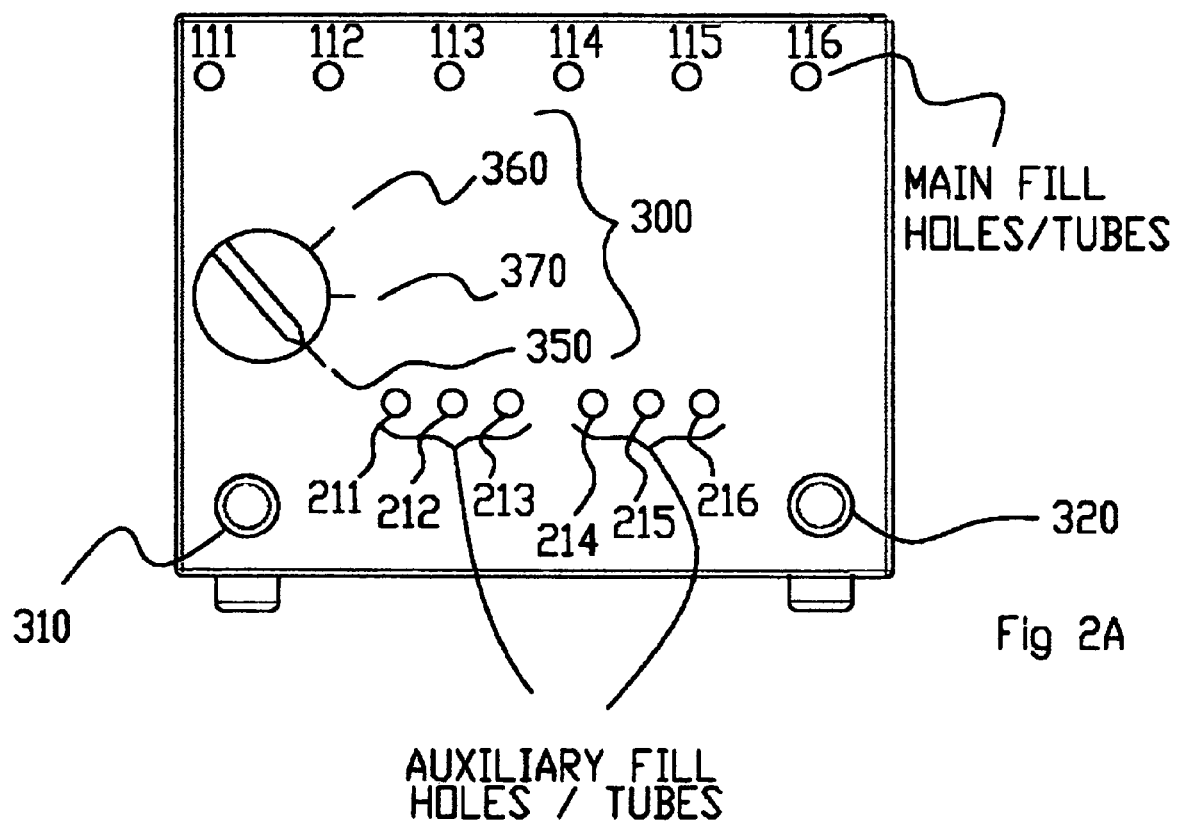

RUNING FROM MAIN BATTERY

RUNNING FROM AUXILIARY BATTERY

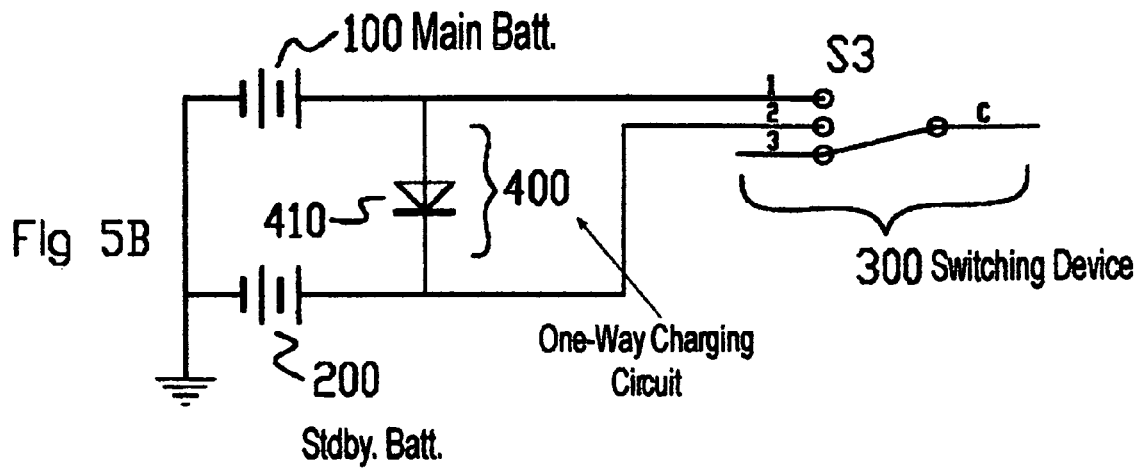
Fig 5B — OFF NO BATTERY CONNECTED
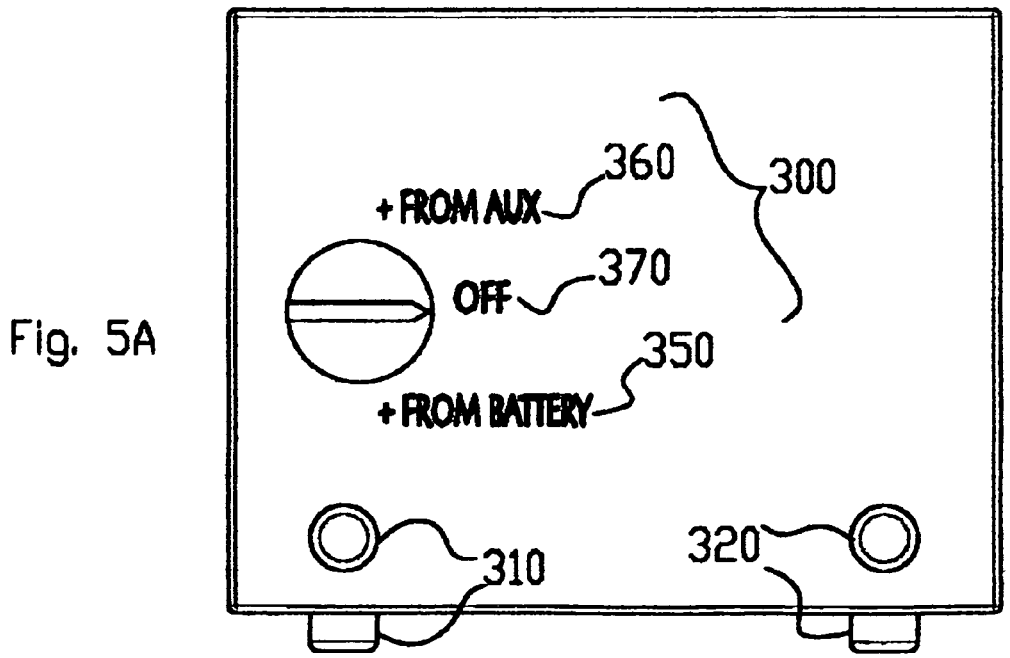
Fig. 5A

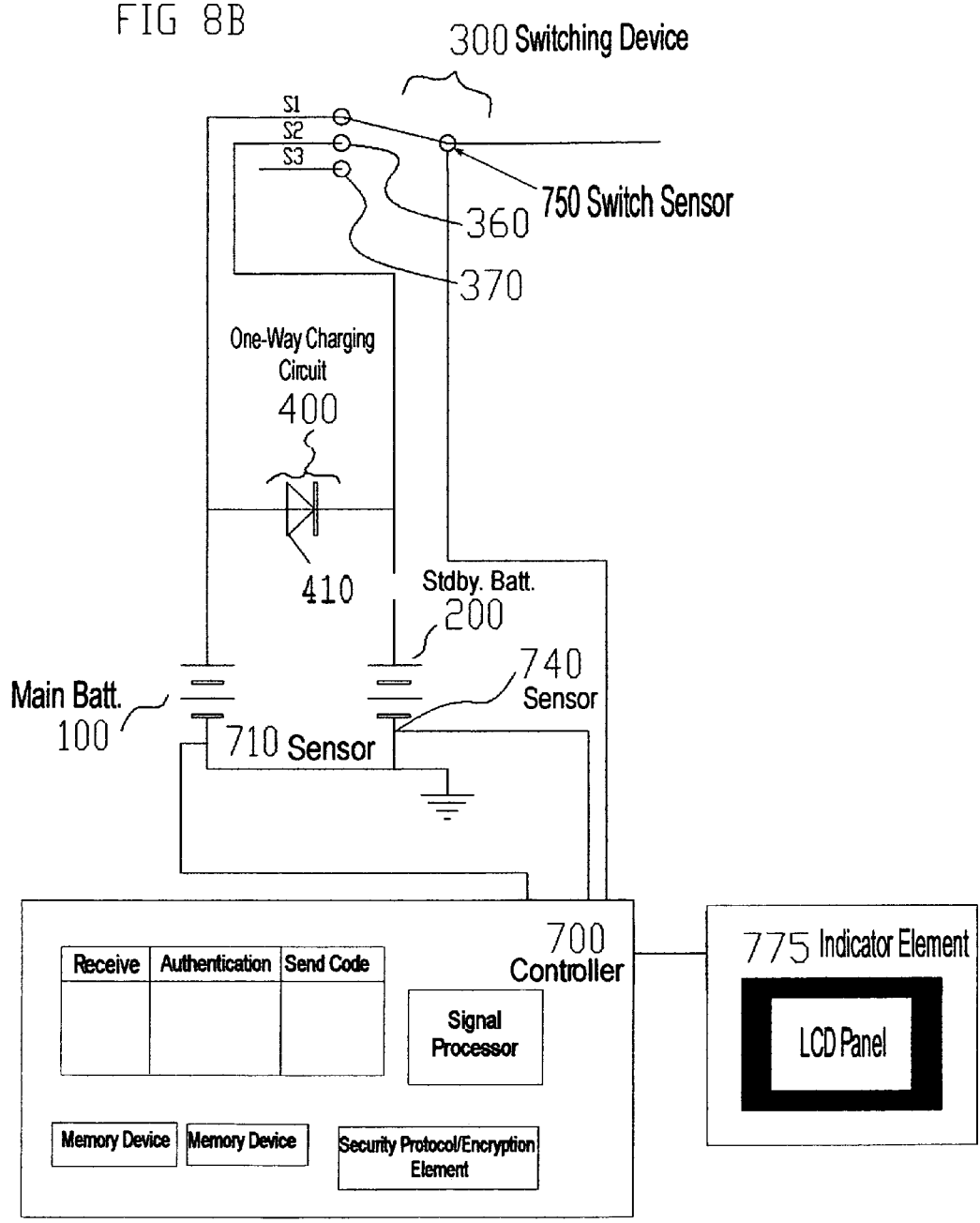

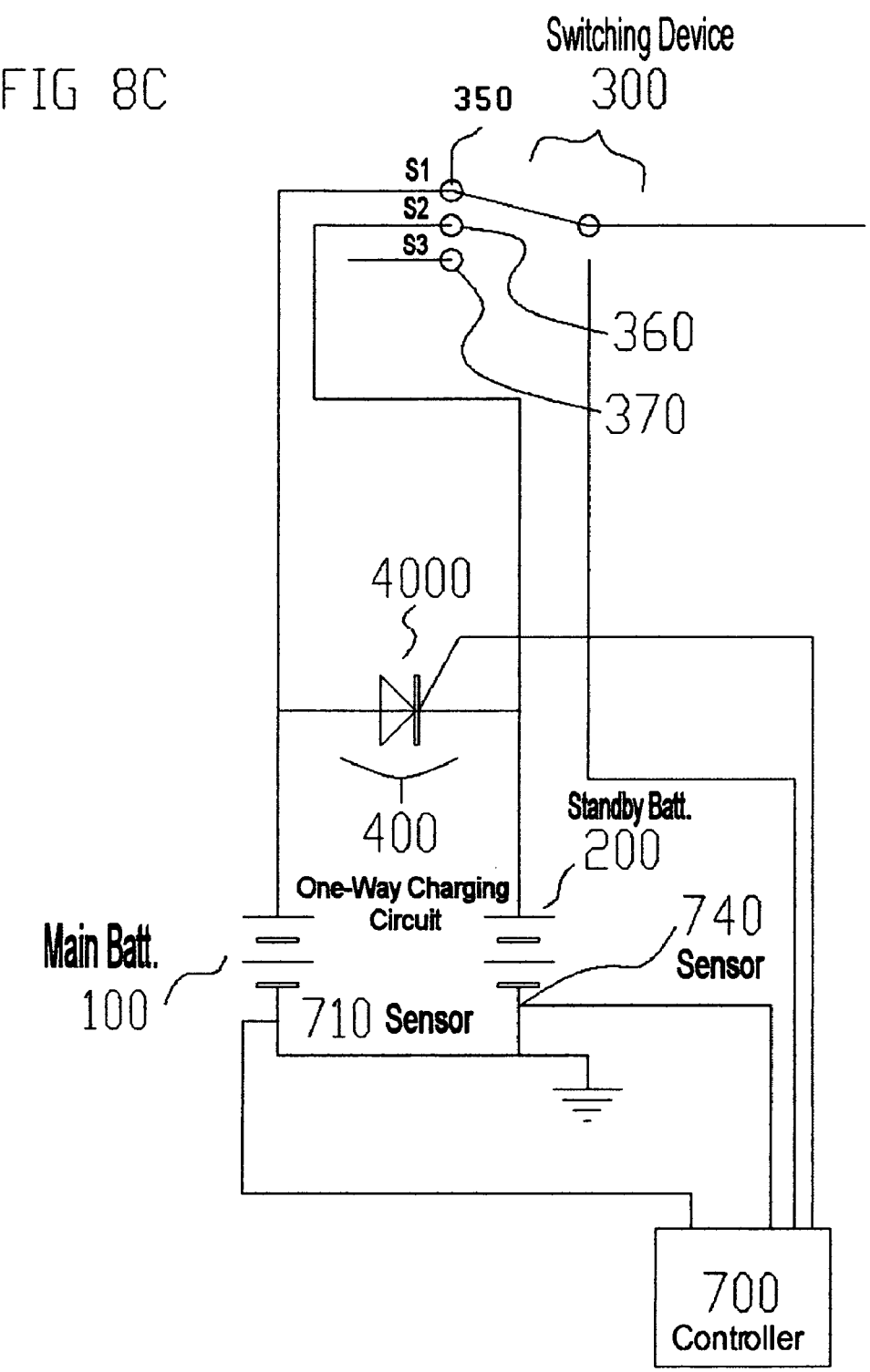

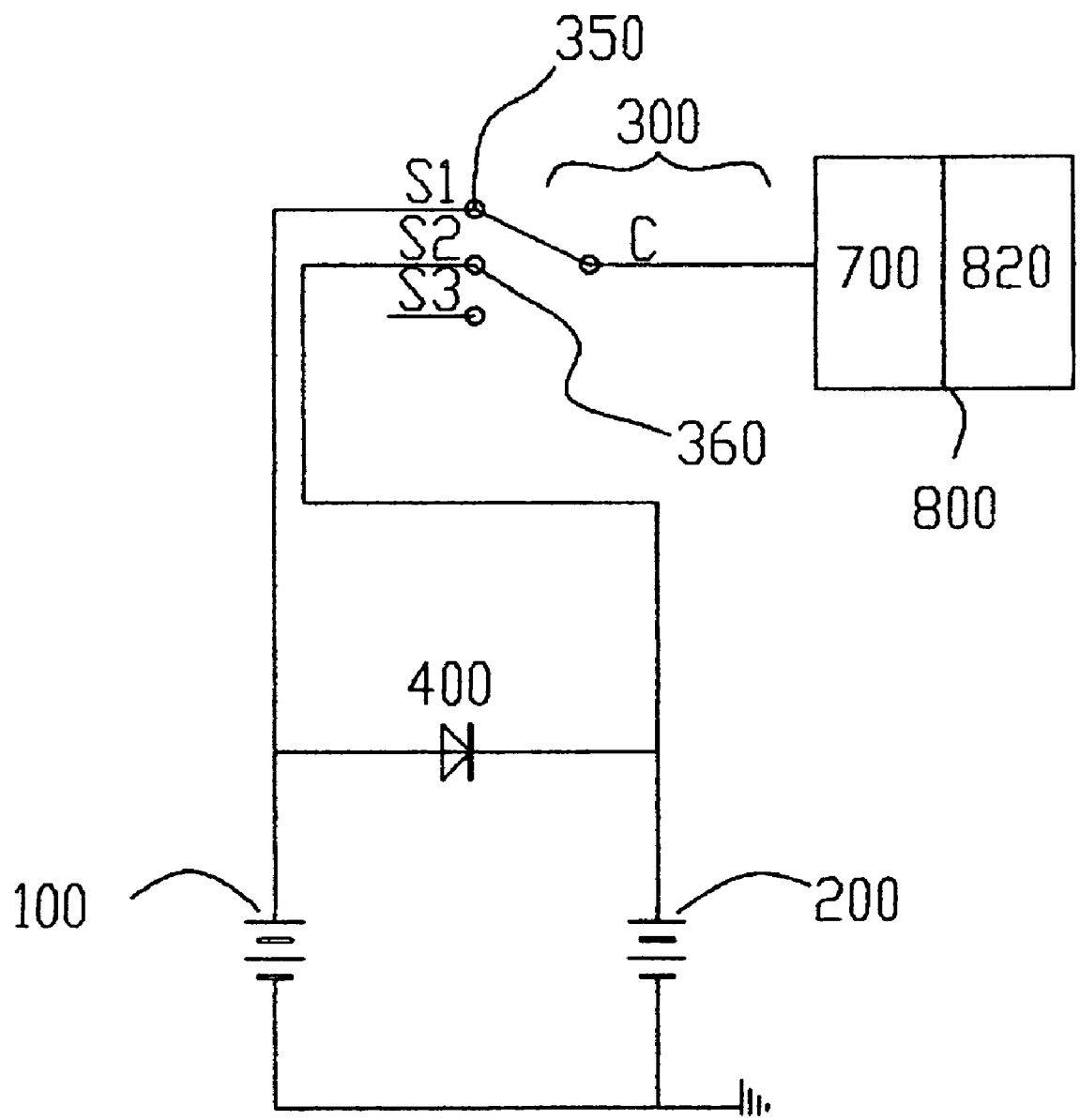

REMOTELY CONTROLLED MULTIPLE BATTERY SYSTEM

CROSS REFERENCE TO RELATED APPLICATIONS

This application is a Divisional Application of U.S. patent application Ser. No. 10/708,739, filed Mar. 22, 2004 now U.S. Pat. No. 7,388,349, entitled "Multiple Battery System and Network Controlled Multiple Battery System", which is a Continuation-in-Part of patent application Ser. No. 10/604,703, now U.S. Pat. No. 7,339,347 B2, entitled "Multiple Battery System and Auxiliary Battery Attachment System" filed on Aug. 11, 2003. This application is also related to co-pending U.S. application Ser. No. 12/149,949 filed on May 9, 2008 and to U.S. application Ser. No. 12/149,948, filed May 9, 2008.

BACKGROUND OF INVENTION

The present invention relates, generally, to rechargeable battery systems including a main and an at least one auxiliary battery disposed for selective electrical communication, and more particularly to vehicle battery systems wherein the batteries of the battery system are configured within a housing having conventional external dimensions. Additionally the present invention includes an attachment for providing an at least one auxiliary battery attachment system to a conventional battery with circuitry for selectively engaging the main and at least one auxiliary battery and a method of detecting electrical faults in an electrical system coupled to the battery system.

Almost every vehicle utilized today requires a battery to operate. The battery usually initiates an internal combustion reaction that is at the heart of conventional motors. Additionally, with the development of electric and hybrid electric vehicles that rely directly on batteries to function there is an increased need for a reliable supply of power from batteries. Recently, significant improvements in battery technologies have allowed conventional sized batteries to have increased power, increased operating life, better response to discharge and recharge cycling, and lower maintenance requirements than predecessors. This has allowed for improved starting, as well as prolonged operation of vehicles, equipment, and auxiliary devices.

However, the elements of a conventional battery have changed little, even as many other aspects of vehicle technology and safety have improved. Conventional vehicle batteries, for example, include a fairly standard sized rectangular casing containing cells (six cells for twelve-volt batteries—three cells for six-volt batteries). These cells typically contain positive and negative battery plates and electrolytic fluid to allow the battery to store reserve electricity and replenish this reserve from a generating source, such as an electrical system. The battery is typically coupled through a standard set of electrical cables to the electrical system of the vehicle or piece of equipment.

However, a significant problem with existing batteries occurs if, for any reason, the conventional battery loses power or is discharged. The required source for electrical power to start or operate the vehicle or device is lost. Similarly, if, for instance, automobile lights are accidentally left on for extended periods of time without the automobile running, discharge of the battery is inevitable. Additionally, if other auxiliary equipment, such as a radio, fan, or the like, is left on without the engine running similar problems can occur. A still further way the electrical system of a vehicle might fail is through shorts or bad connections to the battery, so that the battery does not recharge during use. This may also occur when a recharging mechanism, such as an alternator or generator, is non-functioning. These are just some of the types of problems or discharge scenarios that may occur in which failure of or discharge of the battery leaves the vehicle helpless.

One way to provide power back to the battery in the case of a discharge scenario is through a jump-start. However, this requires an additional vehicle, which may not be available. Jump-starting also subjects both the discharged battery and the jump-starting battery to potential damage, even the possibility of a catastrophic explosion if the electrical connections are improperly coupled. There are also commercially available alternatives to vehicle-to-vehicle jump-starting. Primarily these devices comprise portable auxiliary power sources for jump-starting a discharged battery. A major drawback of these devices is that they require the electrical system of the vehicle to be in operable condition to restore the battery. Most of these portable "emergency batteries" typically comprise a small reserve battery which is plugged into the electrical system of an automobile, for example through the cigarette lighter plug, and can only be recharged in a household outlet. As it cannot be recharged from the vehicle, if the discharge recurs for any reason the user is potentially stranded. These systems, together with the conventional methods of jump-starting a battery, currently provide the only commercially available ways to overcome the loss of power in a battery or other discharge scenario.

Several attempts at improving the functionality of batteries in discharge scenarios by utilizing auxiliary batteries to forestall the need for jump-starting have been attempted, but none have met with any commercial success. These previous commercial attempts at dual battery systems have proven unreliable and cumbersome or worse, non-functional. Many significant drawbacks are seen in many of the early systems, requiring costly modifications due to non-standard battery sizes, modifications to the battery terminals, and/or modification to the electrical system of the vehicle or the device. These modifications made these systems costly to implement and less reliable than the standard sized batteries. Examples of these early attempts include U.S. Pat. No. 3,200,014 to Roberts and U.S. Pat. No. 3,029,301 to Strider.

Another example of these early systems included a three-post system from DELCO. The battery housing had three external terminals extending from the cover: a main battery positive terminal, a reserve battery positive terminal, and a common negative terminal. The negative terminal electrodes of each battery in the system were purportedly connected through a link in the battery housing cover assembly. Thus, this vehicle electrical system required three cables to accommodate the system and required an additional solenoid that was activated during starting. This non-standard configuration meant additional costs and headache for the end-user, requiring special three post batteries and cables. This and the added costs from the need for additional electrical components made the devices commercially unsuccessful.

Additional attempts at achieving a commercially successful system have been made that would fit standard electrical cable configurations, but these have also failed. Vehicle battery systems like those shown in U.S. Pat. No. 5,002,840 to Klebenow et al. and U.S. Pat. No. 5,162,164 to Dougherty et. al. (the '840 and '164 patents), show a main and a reserve unit, separated simply by a one-way diode for maintaining the reserve unit in the charged condition during non-use. The main and reserve batteries of the '840 and '164 patents are coupled in parallel with a diode and resistor therebetween and would require only the standard two-post battery configuration. In a normal operating mode a resistor, for instance a variable resistance, positive temperature coefficient resistor, precedes the one-way diode. The variable or positive coefficient resistor steps down the amperage to limit the amount of current, and, hence, the amount of heat generated by the diode. The diode prevents the reserve battery from discharging to the main battery while allowing current to reach the battery, but it is limited to providing a trickle charge to the reserve battery for recharging. A shunt is provided that is engaged in discharge scenarios to effectively bypass the resistor and diode and put the two battery units in parallel without the diode, and thereby engage the reserve battery. The entire system is coupled through the negative terminals of each battery that are brought into contact in the parallel circuit.

These circuits and battery configurations have several disadvantages. The diodes described in the '840 and '164 patents are low capacity diodes. These low capacity diodes are problematic in that they have a limited current carrying capacity. Since the low capacity diodes have a relatively small current carrying capacity, they may be destroyed if excessive current is driven through them. For instance if the full current capacity of a vehicle electrical system were driven through the diode alone, the diode would be destroyed. Thus these systems need to step down the current with a resistor. This limits the amount of current used to charge the reserve battery. Therefore, these devices and other devices like them are limited to charging the reserve battery with a low current or "trickle" charge, taking a significant amount of time to recharge this reserve battery. The long duration to charge the reserve battery is a significant disadvantage of such devices in discharge scenarios.

Moreover, the engagement of the shunt in the circuit as described dumps the discharged battery into parallel with the charged battery. The charged reserve battery thus has to contend with both the load placed on it by the vehicle or device and the load of the discharged main battery. Operator error can cause additional problems. If the switch or shunt is inadvertently left in the bypass mode or if an undetected fault occurs in the battery or electrical system, the reserve unit will discharge along with the main unit, thereby impairing the ability of the reserve unit to function as an auxiliary starting battery.

Thus, in a discharge scenario, the device of the '840 and '164 patents would put added stress on the reserve battery and, potentially, require a long cycle time to recharge the reserve electrical power stored therein. This would be an especially grave problem if the vehicle were to have a short or other electrical system failure, severely limiting the operating time of the vehicle on just the reserve battery.

Similarly, U.S. Pat. No. 5,256,502 to Kump discloses a set of plates and plate frames, movable bus bars, and circuitry components, including a diode in the circuitry that allows for recharging of a reserve battery defined from the set of plates and engaged by a switch. The diode prevents current from being drawn from the reserve battery unless a switch is turned to a reserve setting. Similar to the '840 and '164 patents, in the '502 patent when the reserve battery plates are selectively engaged, it puts the main and reserve batteries in parallel with each other upon engagement of the switch. This solution has the same problems as the '840 and '164 patents, and, similarly couples the negative terminals of the two batteries. The reserve battery is saddled with the load of the electrical system and the load of the discharged main battery when trying to start from a discharge scenario, as engagement draws the reserve electrical energy in the system down. There is no suggestion in any of the aforementioned references of any way to overcome this problem, and in the case of the '502 patent, there is no way electrically isolate the reserve battery as it is composed of plates shared with the main battery.

In U.S. Pat. No. 6,121,750 to Hwa, a two battery system is disclosed having a microprocessor control switch. The Hwa device contains two twelve-volt batteries in a single housing sharing a common negative terminal end and a single positive terminal. The secondary battery is provided for intermittent engagement to fulfill requirements for short duration, high current output situations. A switch box is provided to permit switching from just the main battery to engaging the main and secondary battery. Again, the batteries are in parallel when engaged and would be poorly equipped to deal with a discharge scenario, for reasons similar to those previously discussed in regards to the other references. Furthermore, there is no indication or suggestion of a diode or similar device provided in the circuitry of the '750 patent for charging the secondary battery and, thus, the secondary battery is not necessarily kept in a charged state, because the secondary battery is only providing additional cranking power.

The U.S. Pat. No. 5,683,827 patent to Yu discloses a silicon controlled rectifier for automatically switching off the battery pack when the battery pack generates an output voltage lower than a threshold voltage during a discharge cycle. The rectifier is coupled with individual cells in a series of sells that comprise a battery pack. The system switches packs, but does not provide for reserve electrical energy beyond the individual cells. Moreover, the switching does not teach or suggest an auxiliary battery, nor does it teach isolating an auxiliary battery in case of a discharge scenario.

The performance of all of the heretofore known multiple battery systems have been unsatisfactory. Even with the existing attempts to provide readily available reserve power in a battery, there is still significant room for improvement and a need for emergency starting power. Prior attempts required retrofitting vehicles to accommodate different sized battery housings, different terminal configurations, or remote circuitry, which is often cost prohibitive. To date, no system has been developed to provide the reserve power that is necessary to operate a vehicle or piece of equipment in an emergency and be sufficiently reliable in all situations.

The known multiple battery configurations do not permit disposition of at least two batteries, each capable of delivering sufficient power to start and operate a vehicle, within a housing defined by a conventional vehicle battery envelope and having terminal locations designed to accommodate conventional cable configurations. No system is available that provides the full current of the electrical system of the vehicle to immediately begin recharging the at least one auxiliary battery. In fact, the reliability and safety of previously attempted systems is hampered by diodes with insufficient current-carrying capacity, these same diodes may in fact be destroyed during recharge. Additionally, none of the previous devices has been able to provide both a one-way charging circuit and, when needed, the ability to isolate the auxiliary battery to provide emergency power. Finally, none of the prior devices can provide a method for determining whether the cause of the main battery discharge is in the electrical system of the vehicle and still provide the auxiliary power necessary in this situation to get assistance.

SUMMARY OF INVENTION

The myriad of advantages of having reliable, readily accessible auxiliary electrical power in the multiple battery system of the instant invention can easily be appreciated. It eliminates the need to jump-start the vehicle or, if the electrical system has failed, it allows the user to determine such a failure and try to reach some assistance while on the auxiliary battery. The instant invention also eliminates the danger of trying to jump-start an automobile, where there is the potential for electrical sparking and explosion. Additionally, by avoiding the need for a jump-start with the instant invention, both safety and security are improved, as there is no need to leave your vehicle to seek assistance or flag down strangers when the vehicle will not start. Improved time to charge is also an important further advantage of the instant invention. Re-charging a battery with known devices can take significant amounts of time, if it is even possible, for instance in situations where you are stuck on a lonely back road. However, the instant invention allows the user to quickly start and immediately begin recharging both a main and an at least one auxiliary battery. These and other objects of the invention are discussed further herein.

It is an object of the present invention to provide an improved vehicle battery that solves or improves over the problems and deficiencies in the art.

Another object of the present invention is to provide an improved multiple battery system and a battery attachment system that is generally universally installable in place of a conventional battery.

Another object of the present invention is to provide an improved vehicle battery that contains sufficient reserve electrical power for most, if not all, situations, even in worst-case type discharge scenarios, such as failure in the electrical system.

A further object of the present invention is to provide an improved vehicle battery that provides auxiliary power easily and virtually instantaneously.

A still further object of the invention is to provide an improved vehicle battery which is simple in construction, but that does not require substantial and costly structures or modifications to existing electrical systems, circuitry, or other components, and which is economical to manufacture and use.

Another object of the present invention is to provide an improved vehicle battery that is efficient, durable, and reliable.

An object of the instant invention is to provide a circuit to isolate an auxiliary battery with sufficient reserve power to reliably start or operate a vehicle or piece of equipment.

A further object of an exemplary embodiment of the instant invention is efficient utilization of the available space within conventional battery housing dimensions such that the main battery exceeds SAE recommended minimum CCA output ratings for most original equipment manufacturer (OEM) vehicles.

A further object of an exemplary embodiment of the instant invention is to provide a switched multiple battery system having a main battery in selective electrical communication with an auxiliary battery, the system being disposed within a housing characterized by conventional external dimensions and the terminals being disposed to accommodate conventional vehicle cable configurations. The use of a conventional battery-housing envelope facilitates relatively low cost production through the utilization of existing manufacturing equipment and processes. Moreover, it allows for immediate substitution of the present invention for existing batteries.

In accordance with one object of an exemplary embodiment, the cells of the main battery are disposed along the longitudinal axis of the battery housing and above the auxiliary cell housing. The cells of the auxiliary battery can be approximately one-quarter the height of the main cells. In the exemplary embodiment the auxiliary cells are disposed below the main battery. This configuration renders the subject battery system interchangeable with a wide range of conventional two-terminal automotive batteries.

In accordance with another object of an exemplary embodiment of the invention, the switching mechanism is also disposed within the cover and includes a manually operable actuator for selectively establishing communication between the main and reserve batteries.

According to a further object of the invention, the switched multiple battery system is configured for disposition within a vehicle for electrical communication with conventional vehicle battery cables. In the event the main battery output is too low to start the vehicle, the operator manipulates the switch to the auxiliary position, thereby bringing the auxiliary battery online, which is maintained in the fully charged state by the charging diode circuit. Upon starting the vehicle, the operator manipulates the switch back to the normal position, thereby engaging the main battery to operate and recharge from the electrical system and recharging the auxiliary batteries with the electrical system through the one-way charging circuit. The main and auxiliary batteries being recharged in the conventional manner during vehicle operation.

Additionally, a still further object of the invention is that the power in the auxiliary battery allows the automobile to be operated even when the main battery is discharged or incapacitated. Thus, when the main battery is not usable, the auxiliary battery can be utilized until repair or replacement can be conveniently obtained.

Another object of the present invention is that both the primary and the secondary storage battery are of a sufficient strength so that under ordinary weather conditions either will operate the starter and vehicle without the aid of the other. Thus, if one of the two batteries is totally discharged for some reason the, vehicle will still be operable.

The apparatus of the invention includes a multiple battery system. The multiple battery system includes a battery housing having a common positive terminal and a common negative terminal each coupled to an electrical system. The main battery has a main positive output and a main negative output and the at least one auxiliary battery has an auxiliary positive output and an auxiliary negative output. The multiple battery system includes a main electrical circuit that couples the common positive terminal with at least one switching device. The at least one switching device has at least two operating positions. In a first operating position of the at least two operating positions, the common positive terminal is coupled to the main positive output of the main battery and to a one-way charging circuit that precedes and is coupled to the auxiliary positive output. In a second operating position the common positive terminal is coupled through the at least one switching device to a point in the main circuit beyond the one-way charging circuit that couples to the auxiliary positive output, coupling the common positive terminal to the auxiliary positive output.

In the battery system the main battery can be electrically isolated from the auxiliary battery in the second position of the at least one switching device.

In the system the battery housing can also include an at least one main battery compartment containing the main battery. The main battery can be one of a six-volt, a twelve-volt, a fourteen-volt, or a twenty-four volt battery.

In a further embodiment of the multiple battery system only the coupling of the positive output of the main battery and the positive output of the at least one auxiliary battery are switched by the switching device. Additionally, the second operating position of the at least two operating positions can isolate the main battery from the electrical system and introduces only the at least one auxiliary battery.

The battery housing can also include an at least one auxiliary battery compartment containing the at least one auxiliary battery. The at least one auxiliary battery can be one of a six-volt, twelve-volt, fourteen-volt, or twenty-four volt battery. Additionally, the main battery can be a twelve-volt battery having six, two-volt cells and the at least one auxiliary battery can be a twelve-volt battery having six two-volt cells.

The battery housing can also have a main battery compartment containing the main battery and an at least one auxiliary battery compartment containing the at least one auxiliary battery, the main battery compartment being located atop the at least one auxiliary battery compartment.

The battery housing may also have at least one fill tube.

The at least one fill tube can be an at least one main battery fill tube. The main battery can comprise an at least one cell and the at least one main fill tube can be a main fill tube for each cell of the main battery. The at least one fill tube can also be an at least one auxiliary battery fill tube. The auxiliary battery can comprise at least one cell and the at least one auxiliary fill tube can be an auxiliary fill tube for each cell of the auxiliary battery. Moreover, the at least one fill tube can be an at least one main fill tube and an at least one auxiliary fill tube, the at least one auxiliary fill tube passing through the main battery compartment.

The one-way charging circuit of the multiple battery system can comprise an at least one one-way charging diode. The at least one one-way charging diode can be an at least one silicon rectifier.

The at least one silicon rectifier can be between about a 25 and 95 amperage rating. In a still further exemplary embodiment, the main battery can be a 12-volt automobile battery and the at least one silicon rectifier can have a 12-volt, 45 amp rating. Additionally, the charging circuit can comprise an at least one high capacity diode and an at least one heat sink coupled to the at least one high capacity diode. The at least one high capacity diode can have between about a 25 and 95 amperage rating. More-over, in yet another exemplary embodiment, the at least one high capacity diode can have a 12-volt, 45 amp rating and the at least one heat sink coupled to the high capacity diode can have sufficient surface area to dissipate the heat generated by the 12-volt, 45 amp rated at least one high capacity diode.

The multiple battery system can also have a controller coupled to and switching the at least one switching device. The multiple battery system can also have an at least one sensor in communication with the controller. The at least one sensor can include an at least one main battery voltage sensor, an at least one main battery amperage sensor, an at least one auxiliary battery voltage sensor, an at least one switch position sensor, and an at least one auxiliary battery amperage sensor. The controller can couple to and communicate with the position sensor to detect the position of the switching device and selectively engage the switching device based on the input of at least one of the at least one main battery voltage sensor, the at least one main battery amperage sensor, the at least one auxiliary battery voltage sensor, and the at least one auxiliary amperage sensor.

The multiple battery system can also have an auxiliary battery discharge system. The auxiliary battery discharge system can have a controller with a timer. The timer can signal the controller to periodically change the switch position so as to discharge the auxiliary battery in the second operating position of the at least two operating positions for periods and then switch back to the first operating position of the at least two operating positions.

The discharge system can also be a written instruction to manually switch the battery system to the second operating position for a period of time and then to manually switch the switching device to the first operating position.

The discharge system can also have the controller switch the switching device to couple the common positive terminal to the auxiliary battery positive output if an input signal from an at least one sensor indicates that the main battery voltage or amperage is below a trigger point.

The apparatus of the instant invention also includes a multiple battery system comprising a battery housing having a common positive terminal and a common negative terminal coupled to an electrical system; a main battery having a main positive output and a main negative output; an auxiliary battery having an auxiliary positive output and an auxiliary negative output; a switching device with at least two operating positions, the at least two operating positions selectively engaging said main battery and said auxiliary battery. The first operating position of said at least two operating positions can have the common positive terminal coupled to the main positive output and to the auxiliary positive output through a one-way charging circuit between and preceding the auxiliary battery. The second operating position of said at least two operating positions can couple the common positive terminal to the auxiliary positive such that the common positive terminal is coupled at a point beyond the one-way charging circuit to the auxiliary battery positive.

The second operating position of the multiple battery system can put the auxiliary battery alone in series with the electrical system and prevents electrical energy in the auxiliary battery from flowing to the main battery. The one-way charging circuit can electrically isolate the main battery in the second operating position. In the first operating position, electrical energy from the electrical system flows into the main and through the one-way charging circuit to the at least one auxiliary battery, the one-way charging circuit prevents electrical energy from flowing out of the at least one auxiliary battery. Further, in one exemplary embodiment of the instant invention only the positive outputs of the main battery and the at least one auxiliary battery are switched by the switching device. Additionally, when in the second operating position of the at least two operating positions, the system can fully disconnect the main battery from the electrical system and introduce only the at least one auxiliary battery.

The main battery can be one of a six-volt, twelve-volt, fourteen-volt, or twenty-four volt battery. The at least one auxiliary battery can be one of a six-volt, twelve-volt, fourteen-volt or twenty-four volt battery.

The battery housing can comprise a main battery compartment containing the main battery and an at least one auxiliary battery compartment containing the at least one auxiliary battery, the main battery compartment being located atop the at least one auxiliary battery compartment. The battery housing can also include at least one fill tube.

The one-way charging circuit can comprise an at least one one-way charging diode. The at least one one-way charging circuit can also comprise an at least one silicon rectifier. The at least one silicon rectifier can be between about a 25 and 95 amperage rating. The main battery can also be a 12-volt automobile battery and the at least one silicon rectifier has a 12-volt, 45 amp rating. The charging circuit can further comprise an at least one high capacity diode and an at least one heat sink coupled to the at least one high capacity diode. The at least one high capacity diode has between about 25 and 95 amperage rating. The at least one high capacity diode can also have a 12-volt, 45 amp rating and the at least one heat sink coupled to the high capacity diode that can have a sufficient surface area to dissipate the heat generated by the at least one diode.

The system can also have a controller coupled to and switching the switching device. An at least one sensor in communication with the controller can be provided. The at least one sensor in communication with the controller can include an at least one switch position sensor to detect the position of the switching device and the controller can then actuate the switching device based on input from the an at least one switching device sensor and at least one of a main battery voltage sensor, a main battery amperage, an auxiliary battery voltage sensor, and an auxiliary amperage sensor.

The system of the instant invention can also comprise an auxiliary battery discharge system. The discharge system can comprise a controller with a timer, where the timer signals the controller to periodically change the switch position so as to discharge the auxiliary battery in the second operating position of the at least two operating positions for short periods and then switches back to the first operating position of the at least two operating positions.

The discharge system can also be a written instruction to manually switch the battery system to the second operating position for a brief period of time and then to manually switch the switching device to the first operating position.

The controller can also switches the switching device to couple the common positive terminal to the auxiliary battery positive output if an input signal from an at least one sensor indicates that the main battery voltage is below a trigger point.

The system can also be provided with an auxiliary battery cyclic discharge system that can include a timer coupled to the switching device, wherein the timer periodically actuates the switching device to the second operating mode for a short period of time and, then, actuates the switching device back to the first operating mode after the short period of time.

The apparatus of the invention also includes an auxiliary battery attachment system having a main battery with an at least one main positive output and an at least one main negative output and a circuitry housing having an at least one positive common terminal, an at least one negative common terminal, an at least one positive coupling and an at least one negative coupling, the at least one positive and negative couplings electrically coupling the at least one positive and at least one negative main battery out-puts to the at least one positive and at least one negative common terminal which are in turn coupled to an electrical system. The system also includes an at least one auxiliary battery having an auxiliary positive output and an auxiliary negative output, each output being electrically coupled to the at least one positive common terminal and at least one negative common terminal, respectively, and a main electrical circuit comprising a coupling of the common positive terminal with an at least one switching device. In the main circuit the at least one switching device having at least two operating positions: a first operating position of the at least two operating positions coupling the common positive terminal through the at least one positive coupling to the main positive output of the main battery and to a one-way charging circuit that precedes and is coupled to the auxiliary positive output and a second operating position wherein the common positive terminal is coupled through the at least one switching device to a point in the main circuit beyond the one-way charging circuit that couples to the auxiliary positive output.

The circuitry housing can be mounted atop the main battery or the circuitry housing can be mounted on a side of the main battery. Also, while in the first operating position, the one-way charging circuit permits electrical energy from the electrical system to flow into both the main and auxiliary batteries, but prevents electrical energy from flowing out of the auxiliary battery. While in the second operating position of the at least two operating positions the system fully disconnects the main battery from the electrical system and introduces only the at least one auxiliary battery.

The at least one positive and negative couplings can be within the circuitry housing. The at least one auxiliary battery is one of a six-volt, twelve-volt, fourteen-volt, or twenty-four volt battery. The circuitry housing can contain the at least one auxiliary battery.

The one-way charging circuit of the attachment system can comprise an at least one one-way charging diode as well. The at least one one-way charging circuit can also be for instance an at least one silicon rectifier. The at least one silicon rectifier can be between about a 25 and 95 amperage rating. The main battery can also be a 12-volt automobile battery and the at least one silicon rectifier can have a 12-volt, 45 amp rating.

The multiple battery system may also provide a charging circuit having an at least one high capacity diode and an at least one heat sink coupled to the at least one high capacity diode. The at least one high capacity diode can have between about 25 and 95 amperage rating. The at least one high capacity diode can also have a 12-volt, 45 amp rating and the at least one heat sink coupled to the high capacity diode having a sufficient surface area to dissipate the heat generated by the 12-volt, 45 amp rated at least one diode.

The multiple battery system can also comprise a controller coupled to and switching the switching device. An at least one sensor can also be in communication with the controller. The at least one sensor in communication with the controller can include at least one switch position sensor to detect the position of the at least one switching device and at least one of a main battery voltage sensor, a main battery amperage sensor, an auxiliary battery voltage sensor, and an auxiliary amperage sensor, the switch device being actuated by the controller based on input from one of the at least one sensor.

The auxiliary battery attachment system can also have an auxiliary battery discharge system. Again, the auxiliary battery discharge system can have a controller with a timer. The timer can signal the controller to periodically change the switch position so as to discharge the auxiliary battery in the second operating position of the at least two operating positions for short periods and then switch back to the first operating position of the at least two operating positions. The discharge system can also comprise a written instruction to manually switch the battery system to the second operating position for a brief period of time and then to manually switch the switching device to the first operating position.

The controller can also switch the switching device to couple the common positive terminal to the auxiliary battery positive output if an input signal from an at least one sensor indicates that the main battery voltage is below a trigger point.

The method of the invention includes a method of detecting a discharge condition fault in an electrical system, which can comprise the method steps of sensing an initial discharge condition within an electrical system of a vehicle or a piece of machinery, switching a battery having a main and auxiliary battery and a switching device with at least two operating positions, a main operating position wherein the main battery is coupled to an electrical system and the at least one auxiliary battery is also coupled through a one way charging diode preceding the auxiliary battery, and an auxiliary operating position in which the auxiliary battery is coupled in series with the electrical system of the vehicle or the piece of machinery and the main battery is electrically isolated. Then utilizing the auxiliary battery in the auxiliary operational position to start the vehicle or piece of machinery and returning the switching device to the normal operating position and engaging the main battery in the normal operating position and determining whether the vehicle or machinery is operational in the normal operating position, failure indicating a general operating fault in the electrical system. The method can also include the step of returning the switching device to the auxiliary position and engaging the auxiliary battery to supply the needed energy to operate the vehicle or machinery and seek repair of the electrical fault.

The invention also includes a system, the system being a multiple battery system having a main battery with a main positive output and a main negative output and an at least one auxiliary battery having an at least one auxiliary positive output and an at least one auxiliary negative output. A main electrical circuit is also provided coupling a common positive terminal with an at least one switching device, the at least one switching device having at least two operating positions to selectively couple the main and at least one auxiliary battery to the common positive terminal. In a first operating position of the at least two operating positions electrical charge is provided to both the main battery and the at least one auxiliary battery. A controller is coupled to the main electrical circuit and switches the at least one switching device based on input from an at least one sensor.

The system can further comprise a first operating position of the at least two operating positions that couples the common positive terminal to the main positive output of the main battery and the common positive terminal to a one-way charging circuit that precedes and is coupled to the at least one auxiliary positive output on the at least one auxiliary battery. The multiple battery system may further comprise a second operating position wherein the common positive terminal is coupled through the at least one switching device to a point in the main electrical circuit, beyond the one-way charging circuit, that couples to the auxiliary positive output. The main battery can be electrically isolated from the at least one auxiliary battery in the second operating position of the at least two operating positions of the at least one switching device.

Further, the system can, but is not limited to, providing only for the coupling of the positive output of the main battery and the positive output of the at least one auxiliary battery are switched by the switching device. The second operating position of the at least two operating positions can, but again is not limited to, electrically isolating the main battery from the system and introducing only the at least one auxiliary battery.

The controller of the multiple battery system can further include an at least one indicator element. The at least one indicator element can for example be, but is not limited to, an at least one klaxon, horn, light, plurality of lights, LCD panel, simulated human voice, human voice, light emitting diode, and a plurality of light emitting diodes. The at least one indicator element in some exemplary embodiments is a plurality of indicator elements having at least one of a red, orange, green, or amber color.

The multiple battery system can further comprise a battery housing with a main battery compartment containing the main battery and an at least one auxiliary battery compartment containing the at least one auxiliary battery. The main battery compartment can be located atop the at least one auxiliary battery compartment in some embodiments. The main battery compartment can also be located aside the at least one auxiliary battery compartment in other embodiments.

The one-way charging circuit of the instant invention can for instance be, but is not limited to, an at least one one-way charging diode. In some embodiments, the at least one one-way charging circuit may further comprise an at least one silicon rectifier. In other embodiments, the at least one one-way charging circuit can be for instance, but is not limited to, an at least one Silicon Controlled Rectifier (SCR). The at least one Silicon Controlled Rectifier (SCR) can for instance be, but is not limited to, being coupled to the controller and being able to disable the coupling with the at least one auxiliary battery.

In some embodiments of the system, the at least one auxiliary battery may comprise a single auxiliary battery. In other embodiments, the at least one battery comprises a plurality of auxiliary batteries. The at least one sensor can, in some embodiments, further comprise an at least one of: an at least one main battery voltage sensor, an at least one main battery amperage sensor, an at least one auxiliary battery voltage sensor, an auxiliary battery amperage sensor, an at least one switch position sensor. The at least one sensor can be for example, but is not limited to, an at least one VI sensor. Similarly, the controller can, in some exemplary embodiments, further comprise at least one of: an at least one microprocessor, an at least one signal processor, an at least one set of lookup tables, an at least one memory device, an at least one security protocol/encryption element and an at least one indicator element.

In some exemplary embodiments, the controller is a wireless controller system. The wireless controller system can include for instance, but is not limited to including, a wireless controller, a wireless transceiver, and an input device. The wireless input device can also include an at least one indicator element. In other exemplary embodiments, the controller can be a network interfaceable controller, where the network interfaceable controller has a network interface and a transceiver. The network interfaceable controller can be in communication with a Network Operations Center (NOC) via a network. The network interfaceable controller can couple to and communicates with the at least one switching device to detect the position of the at least one switching device and selectively engage the at least one switching device based on the input of at least one of the at least one main battery voltage sensor, the at least one main battery amperage sensor, the at least one auxiliary battery voltage sensor, and the at least one auxiliary amperage sensor.

The controller can include a trigger that signals the controller to periodically change the switch position of the at least one switching device so as to discharge the at least one auxiliary battery in the second operating position of the at least two operating positions for short periods and then switch back to the first operating position of the at least two operating positions. The multiple battery system wherein the multiple batteries are part of an at least one of a six-volt, a twelve-volt, a fourteen-volt, and a twenty-four volt battery electrical system.

The invention also includes a network controlled multiple battery system. The system includes a network in communication with a network interfaceable controller and an at least one sensor sensing the condition of an at least one main battery. An at least one controlled switching device is coupled to the at least one network interfaceable controller and responds to an at least one signal from the network to the network interfaceable controller switching from the main battery to an at least one auxiliary battery.

The main battery can include, but is not limited to, a main positive output and a main negative output and the at least one auxiliary battery can include, but is not limited to, an at least one auxiliary positive output and an at least one auxiliary negative output. The at least one controlled switching device can, but is not limited to, switching between an at least two operating positions, each position selectively coupling a common terminal with at least one of the main and the at least one auxiliary battery.

In exemplary embodiments of the system, a first operating position of the at least two operating positions can provide charge to the main battery and provide charge to the at least one auxiliary battery through a one-way charging circuit. A second operating position of the at least two operating positions can couple the at least one auxiliary output of the at least one auxiliary battery to the common output.

The at least one one-way charging circuit can include an at least one one-way charging diode. The at least one one-way charging diode further can for instance be, but is not limited too, an at least one silicon rectifier. The at least one one-way charging diode can also be for instance, but is not limited to, an at least one Silicon Controlled Rectifier (SCR). The at least one Silicon Controlled Rectifier (SCR) can be coupled to the controller and can also shut off if an over charge condition is detected in the auxiliary battery.

The network can also include an at least one controlled switching device that has at least two operating positions, a first operating position of the at least two operating positions coupling a common positive terminal to a main positive output of the main battery and to a one-way charging circuit that precedes and is coupled to an at least one auxiliary positive output of the at least one auxiliary battery and a second operating position wherein the common positive terminal is coupled to the at least one auxiliary positive output of the at least one auxiliary batter a point in the system beyond the one-way charging circuit, effectively isolating the main battery directly connecting the at least one auxiliary battery.

The network controlled multiple battery system can also include an at least one indicator element. The at least one indicator element can have an at least one light emitting diode of an at least one color. The at least one indicator element can also be a plurality of indicator elements having at least one of a red, orange, green, and amber color. The at least one indicator can also be, but is not limited to, an at least one of a klaxon, a horn, a light, a plurality of lights, an LCD panel, a simulated human voice, a human voice, a light emitting diode, and a plurality of light emitting diodes.

The at least one network interfaceable controller of the network controlled multiple battery system can for instance include, but is not limited to, an at least one microprocessor, an at least one signal transmitter, an at least one signal receiver, a security protocol/encryption element, an indicator element, an input/output bus. The at least one sensor can include an at least one VI sensor. The network controlled multiple battery system can be, but is not limited to being, a part of an at least one of a six-volt, a twelve-volt, a fourteen-volt, and a twenty-four volt battery electrical system.

The invention also includes a further multiple battery system having a battery housing with a common positive terminal and a common negative terminal coupled to an electrical system. A main battery having a main positive output and a main negative output and an at least one auxiliary battery having an auxiliary positive output and an auxiliary negative output are also provided. The system includes an at least one switching device with at least two operating positions, the at least two operating positions selectively engaging said main battery and said auxiliary battery and having a first operating position of said at least two operating positions, wherein the common positive terminal is coupled to the main positive output and is further coupled to the at least one auxiliary battery output through a one-way charging circuit between and preceding the at least one auxiliary battery and a second operating position of said at least two operating positions which couples the common positive terminal to the auxiliary positive such that the common positive terminal is coupled at a point beyond the one-way charging circuit to the auxiliary battery positive output. The system also includes a controller coupled to and switching the at least one switching device.

In some exemplary embodiments, the second operating position can couple the at least one auxiliary battery with the electrical system and prevent electrical energy in the at least one auxiliary battery from flowing to the main battery. The one-way charging circuit can electrically isolates the main battery in the second operating position. The at least one auxiliary battery can be a single auxiliary battery. The at least one auxiliary battery can be a plurality of auxiliary batteries.

The one-way charging circuit can for instance be, but is not limited to, an at least one one-way charging diode. The at least one one-way charging diode can be, but is not limited to, an at least one silicon rectifier. The at least one one-way charging circuit can also be, but is not limited to, an at least one Silicon Controlled Rectifier (SCR).

The multiple battery system can also include an at least one sensor in communication with the controller. The controller can actuate the switching device based on input from the at least one sensor and the at least one sensor includes at least one of an at least one main battery voltage sensor, main battery amperage, auxiliary battery voltage sensor, and auxiliary amperage sensor. The multiple battery system can also include an at least one indicator element.

The method of the instant invention includes a method of controlling a multiple battery system comprising the method steps of polling an at least one sensor; detecting an abnormal reading from said at least one sensor; communicating the results of said detection step to an operator or a Network Operations Center; switching, upon a command from the operator, the Network Operations Center, or a controller, from a main battery to an at least one auxiliary battery; and confirming the operation of the system.

The method of controlling a multiple battery system can also include, after the communicating step, the method step of initiating energy conservation steps. The method can also include the method step of monitoring electrical generation and transmission into the system. The method can also include, after the confirming step, the method step of switching back to normal operating mode or alerting the operator or NOC to an electrical fault condition.

The method of the instant invention can also include the additional method steps of detecting a cycling trigger or flag; switching, upon detection of a trigger or flag, to the at least one auxiliary battery; monitoring the at least one auxiliary battery for discharge, adequate recharge and normal operation; running the electrical system on the auxiliary battery for a period of time; checking the at least one auxiliary battery for discharge through the at least one sensor; and returning the at least one switching device back to operating position one to engage the main battery.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF DRAWINGS

FIGS. 2a and 2b show a top view and a cross-sectional view, respectively, of an exemplary embodiment of the instant invention.

FIGS. 5a and 5b show a top view and a circuit diagram, respectively, of an exemplary embodiment of the instant invention in a storage operational mode.

FIG. 8B shows a circuit diagram of an exemplary embodiment of the instant invention incorporating an automatic controller and indicator element.

FIG. 8C shows an electrical schematic of a still further embodiment of the instant invention.

FIG. 9 shows a circuit diagram of an exemplary embodiment of the instant invention incorporating an auxiliary discharge cycling system.

DETAILED DESCRIPTION

Figure 1:
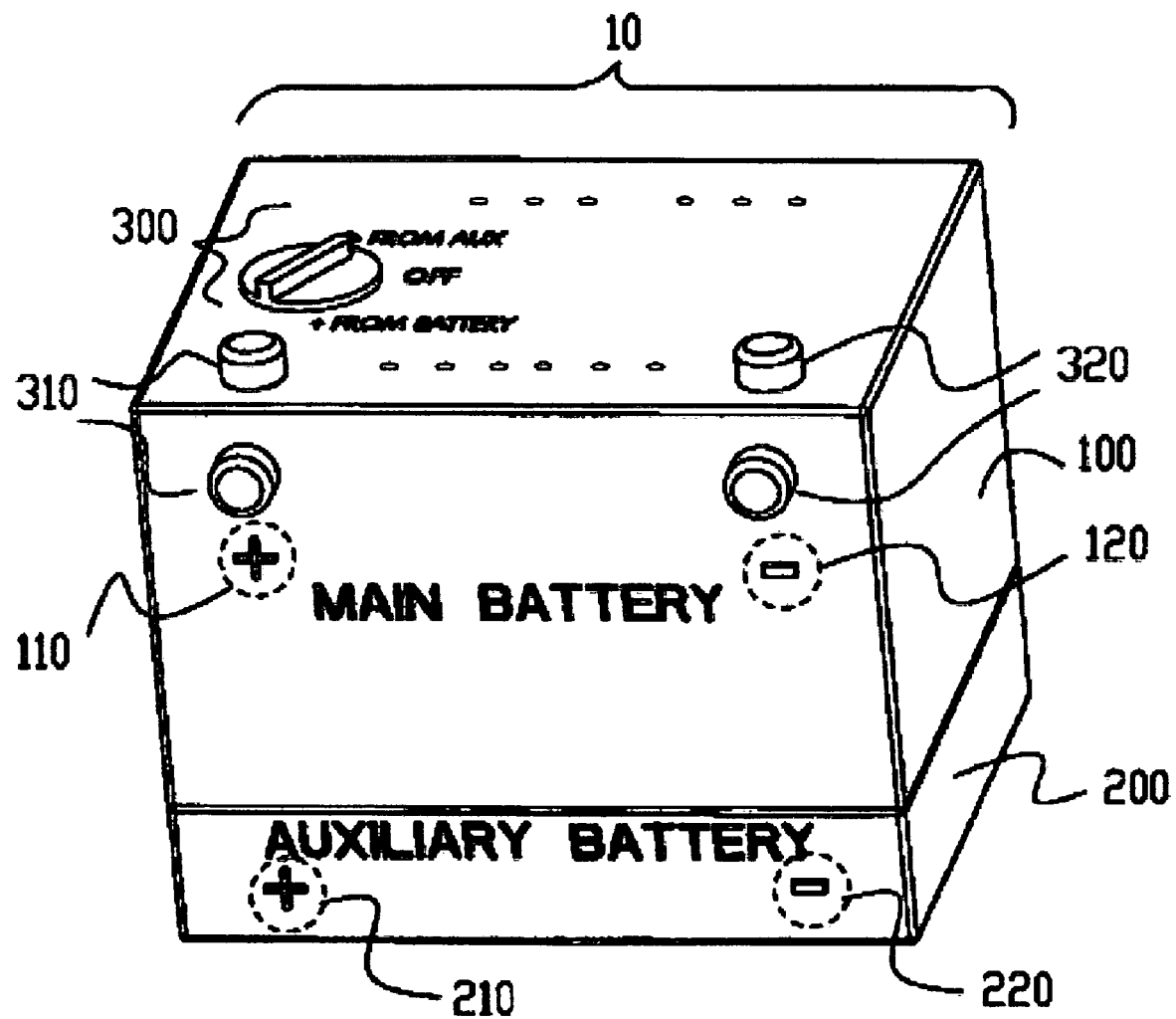
FIG. 1 shows an isometric view of an exemplary embodiment of the instant invention.

In the drawings depicted elements are not necessarily drawn to scale and alike and similar elements are designated by the same and similar reference numerals throughout the several figures.

Figure 2B:
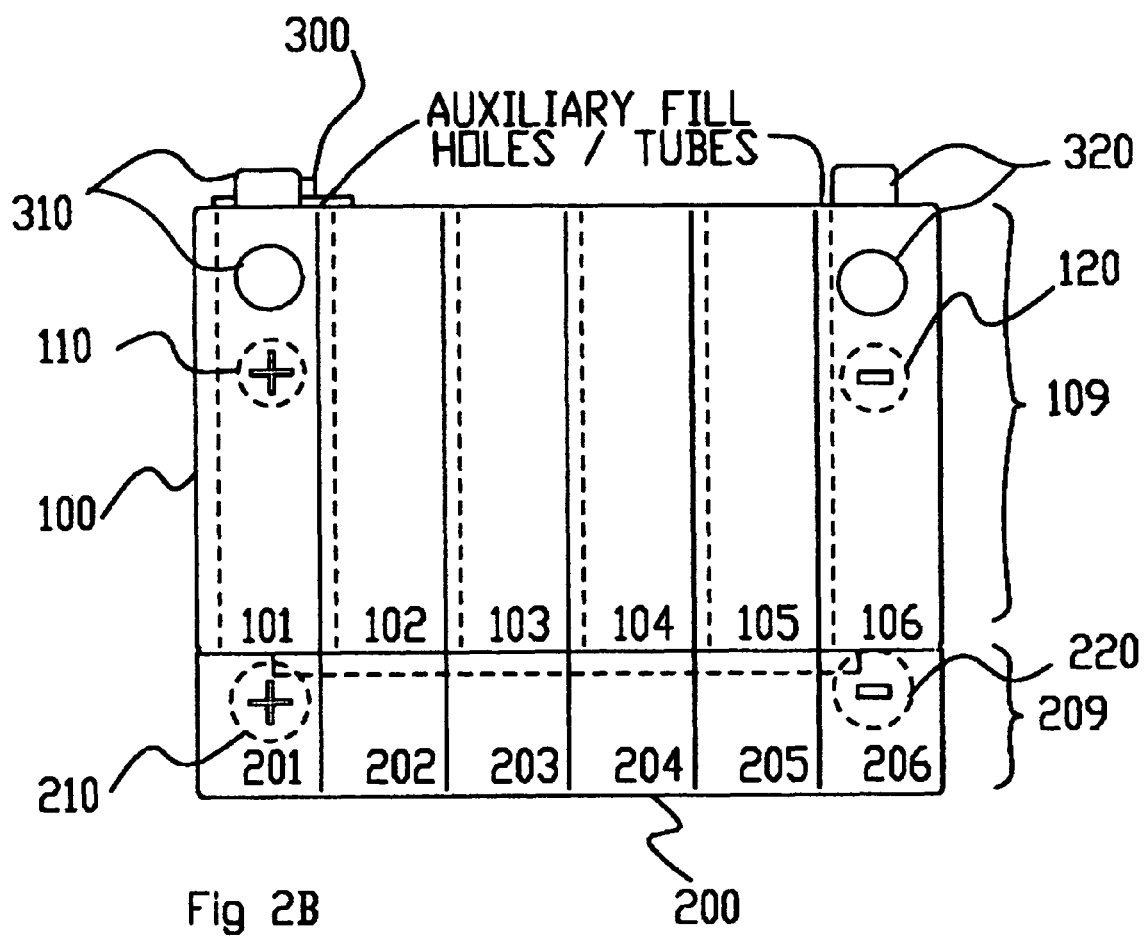

The instant invention is directed to a multiple battery system, having a main and an at least one auxiliary battery combination. In a non-limiting exemplary embodiment the instant invention is dimensioned to be a standard twelve-volt battery for auto, truck, marine and machinery applications meeting the original equipment manufacturers specifications. For instance, the non-limiting exemplary embodiment, as shown in FIGS. 1, 2a and 2b, comprises two twelve two-volt batteries in a single battery housing of conventional size and proportion. The main battery 100 and the standby, auxiliary, or backup battery 200 are contained in the housing 10, as further described herein below. Additional embodiments could include modifications to provide six-volt, twenty-four volt, thirty-six volt, forty-eight volt, seventy-two volt and the like main and/or auxiliary batteries. Additional configurations and variations in the number of batteries, voltage of the batteries, numbers of cells, relative power of each cell, and number of compartments containing the cells can be provided to suit a particular application and would not depart from the aspects of the invention.

FIG. 1 shows an isometric view of an exemplary embodiment of the instant invention. In the exemplary embodiment shown in FIG. 1, as well as in FIGS. 2-5, the upper portion of the battery housing 10 contains the main battery 100 while the lower portion of the battery housing 10 comprises the auxiliary battery 200. In the exemplary embodiment shown, the main battery 100 accounts for about three-quarters and the auxiliary battery 200 accounts for about one-quarter of the battery housing 10. The main battery 100 terminates in a main positive output 110 and main negative output 120. The auxiliary battery terminates in a second or auxiliary positive output 210 and a second or auxiliary negative output 220. Thus, the exemplary embodiment shown provides two positive outputs and two negative outputs internal to the battery housing for each battery.

In the exemplary embodiment of FIG. 1, at least one common positive post or terminal, in this case a set of common positive posts or terminals 310, and at least one common negative posts or terminals, here a set of common negative posts or terminals 320, are electrically coupled to the first 110, 20 and second set 120, 220 of outputs. The positive outputs 110, 210 are selectively coupled through switching device 300, as further described herein below. Additional exemplary embodiments can provide single positive common terminals and single negative common terminals. In the exemplary embodiment of FIG. 1, the coupling of the terminals 310, 320 to the respective outputs is internal to the battery housing 10. This coupling can be done in any suitable manner, for instance a bus coupling or bus bar or through a wiring connection or similar electrical coupling means. Additional batteries may be added and the coupling of the batteries may be made external or partially external to the battery housing without departing from the spirit of the invention.

As depicted in the exemplary embodiment shown in FIG. 1, the common negative and positive terminals or posts 310, 320 protrude from the top and side of the external battery housing so as to be external to the battery housing 10 and easily coupled to electrical connectors extending from the electrical system (not shown). This configuration accommodates the electrical connectors for common vehicle and equipment electrical systems. Variation in the placement, the number and the type of possible posts or connections can be provided without departing from the inventive aspects of the instant invention. One non-limiting example of such a variation would be an exemplary embodiment providing internal connections to the common terminals for systems and vehicles in harsh environments.

The main positive output 110 and auxiliary positive output 210 are coupled to a switching device 300, which in turn selectively electrically couples in various operating positions the batteries 100, 200 and their respective positive outputs 110, 210 to the common positive terminal 310 based on various operating conditions and switch positions. Each operating position corresponds to different circuit configurations for coupling the main battery positive output 110 and auxiliary battery positive output 210 to the common positive output post or terminal 310.

In the exemplary embodiment shown in FIGS. 1-5, switching device 300 is included in the housing. It selectively electrically couples the main battery 100 or the auxiliary battery 200 to the electrical system. Additional embodiments can vary the number of operating positions or location and placement of the switching device 300. For instance, in additional exemplary embodiments the switching device 300 may be included with an attachment or separate housing containing the circuitry and auxiliary battery 200, as discussed further in relation to FIGS. 6 and 7 herein below. Furthermore, for the sake of brevity in this description, reference is made to a three-position switching device 300 having first 350, second 360, and tertiary 370 switch positions. The relative number and position of the switch positions as shown can be changed or varied without departing from the inventive aspects of the device. Additionally, the switching of the switching device 300 may be automated through a control mechanism or circuit that senses the condition of the battery system, as further discussed in relation to FIG. 8 herein below. Moreover, a periodic discharge system for the multiple battery system of the instant invention can also be added, as further described in relation to FIG. 9.

In the exemplary embodiment shown with the three position-switching device 300, the switching device 300 has a first or normal operating mode or position 350. In this position the vehicle or equipment operates off the main battery 100 which is always receiving a charge from the electrical system of the vehicle or equipment when it is running and charging the auxiliary battery 200, as further described in relation to FIGS. 3A and 3B below. The switching device 300 would have a secondary or auxiliary position or operating mode 360, wherein the auxiliary battery 200 would be engaged as the sole source of electrical power for the vehicle or device, as further described in relation to FIGS. 4A and 4B below. The second or auxiliary switch operating mode or position 360 would be used for emergency back up when needed to start and or operate the vehicle when the main battery 100 is incapable of starting or operating the vehicle, equipment, or machinery or when cycling the auxiliary battery 200, as discussed below. Finally, a tertiary or storage operating mode or position 370 would be provided wherein the switching device 300 would disconnect both the main battery positive output 110 and the auxiliary battery positive output 210 from the common positive terminal 310 when not in use.

FIGS. 2a and 2b show a top view and a cross-sectional view, respectively, of an exemplary embodiment of the instant invention. In the exemplary embodiment depicted, each of the batteries is comprised of sets of cells contained within a main compartment 109 and an auxiliary compartment 209, respectively. The main battery compartment 109 and auxiliary battery compartment 209, are located one above the other, however, the relative position of each compartment can be varied. The first set of six two-volt main cells 101-106 is coupled in series to form the main battery 100. The second set of six two-volt cells 201-206 is also coupled in series form the standby, auxiliary, or backup battery 200. The first set of six main cells 101-106 that form main battery 100 terminates at main positive output 110 and main negative output 120. Similarly, the second set of six auxiliary cells 201-206 that form the auxiliary battery 200 terminates at auxiliary positive output 210 and auxiliary negative output 220.

To maintain the electrolytic fluid levels of the main battery 100 and the individual cells 101-106, an at least one thin channel or tube, tubes 111-116 as shown, is provided to the main battery 100 or each of the individual cells 101-106 of the main battery 100. Similarly, to maintain the electrolytic fluid levels of the auxiliary battery 200 and the individual cells 201-206, an at least one thin channel or tube, tubes 211-216 as depicted, drop between the individual main cells 101-106 of the main battery 100 to act as fill tubes for the electrolytic fluid and act as a vent. The fill tubes or channel can be varied in both number and length to suit particular space and manufacturing constraints, but permit the venting of gasses and the maintenance of electrolytic fluid levels. Additionally the fill tubes or channel may be capped or uncapped, as is known in the art.

Figure 3B:
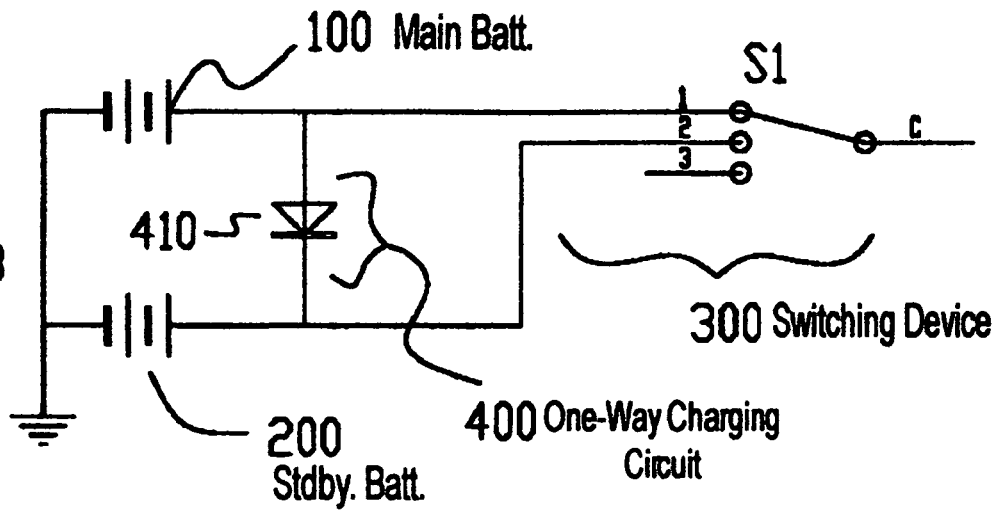
FIGS. 3a and 3b show a top view and a circuit diagram, respectively, of an exemplary embodiment of the instant invention in a normal operational mode.
Figure 3A:
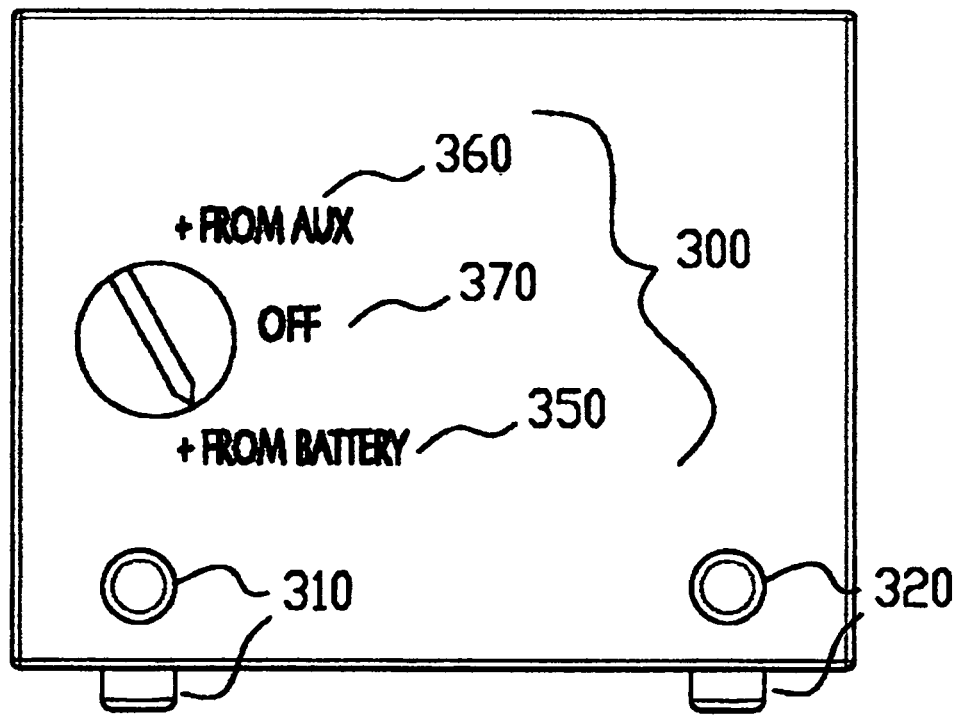

FIGS. 3a and 3b show a top view and a circuit diagram, respectively, of an exemplary embodiment of the instant invention in a normal operational mode. FIG. 3A shows the device in a first switch position 350. In this first, main, or normal switch position or mode 350, indicated in the circuit diagram of FIG. 3B at switch position S1, the main battery 100 is electrically coupled to the electrical system and the auxiliary battery 200 is electrically coupled to the electrical system through the one way charging circuit 400. The electrical system (not shown) is coupled to common positive post 310, which in turn is coupled to the switching device 300. The switching device 300, when in the S1 position or normal operating mode 350, connects the main positive output 110 and via the one way charging circuit 400 the auxiliary positive output 210 to the common positive post 310 and, thereby, the electrical system (not shown). Both the main negative output 120 and auxiliary negative output 220 are coupled to the negative output post or terminal 320, which is coupled back to the electrical system (not shown) to complete the connection.

The two batteries are coupled by a one-way charging circuit 400 that precedes the auxiliary battery 200, as indicated in the circuit diagram of FIG. 3B. The one-way charging circuit 400 is a one-way circuit allowing for electricity to pass from the electrical system of the vehicle (not shown) to replenish the auxiliary battery 200. As the electrical system of the vehicle (not shown) is providing the current needed to run all the auxiliary equipment, it is simultaneously, through the one-way charging circuit 400, also providing a full charging voltage to the backup or auxiliary or standby battery 200 as well as preventing any discharge from the backup or auxiliary battery 200. Effectively, the one way charging circuit 400 is a one-way electrical valve permitting electricity to flow in one direction into the auxiliary battery 200 in the main or first switch position 350.

The one-way charging circuit 400 provides the full current to the auxiliary battery 200 for charging. This is a significant departure from prior systems that disclosed variable coefficient resistors and the like in series with low capacity diodes, as these prior systems could only provide a very small amount of power to the respective standby or reserve battery. Unlike the prior designs that slow the charging current to a trickle charge, the instant invention utilizes a charging circuit that allows for the full current flow to both the main and auxiliary batteries simultaneously to allow for a speedy recovery of both batteries. This does not, however, limit the device from incorporating current regulating components to vary the amount of charge in the circuit, through the charging circuit, or to either of the batteries.

One exemplary embodiment of the one-way charging circuit 400 is a circuit that includes an at least one one-way charging diode 410. The one-way charging circuit 410 can also include, in an exemplary embodiment, but is not limited to, an at least one silicone rectifier. The at least one silicone rectifier as the at least one one-way charging circuit 410 would allow for the full current provided by the electrical system of the vehicle to reach the auxiliary battery 200 for recharging, while generating a minimum heat load and preventing the main battery from draining the auxiliary battery 200. The at least one silicone rectifier 410 can be of any amperage and any voltage as dictated by the amperage and voltage of the electrical system of the application. For instance, silicon rectifiers having amperage ratings of between about twenty-five and ninety-five can be used for example in twelve-volt auto, light truck, and marine systems. A non-limiting example is an exemplary embodiment for conventional twelve-volt automobiles that, for instance, uses a silicon rectifier having a forty-five amp rating as the one-way charging diode 410 as a part of the one-way charging circuit 400. Similarly, a further exemplary configuration could include an at least one Silicone Controlled Rectifier (SCR) as further described in relation to FIG. 8C.

Additional charging circuit configurations could include, but are not limited to, an at least one high capacity one-way diode 410. This can be coupled with an at least one high capacity heat sink as the one-way charging circuit 400. As an exemplary alternate charging circuit configuration the combination of an at least one high capacity diode 410 would need to be coupled to a suitable heat sink or similar heat dissipation device that can handle the high amounts of heat generated by the diode. Having a high capacity diode is critical as the higher amounts of heat might be unsafe if the diode is mounted alone or in too close a proximity to the volatile components of a battery. As the amount and rate of heat dissipation is greatly affected by a wide range of parameters associated with the application, the size and placement of the high capacity diode and the heat sink can vary greatly. Various design parameters associated with the diode environment, including but not limited to the proximity to plastics and volatile chemicals, the size of the at heat sink or sinks, the diode size, the location of the battery, the environment of the battery, and other parameters can be used in determining the size and ratings of the high capacity diode and heat sink combination and placement of the combination within or without the battery housing.

Figure 4B:
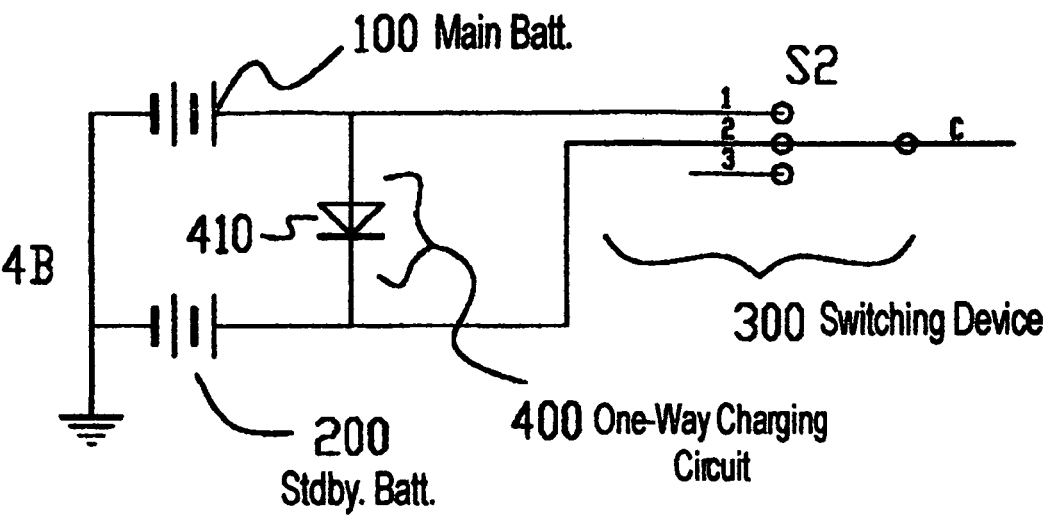
FIGS. 4a and 4b show a top view and a circuit diagram, respectively, of an exemplary embodiment of the instant invention in an auxiliary operational mode.
Figure 4A:
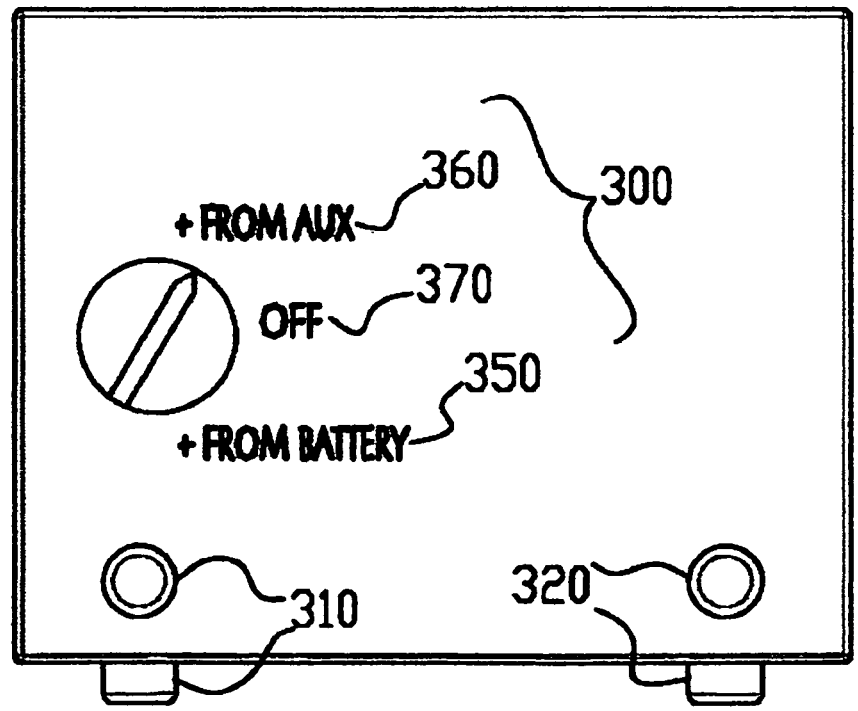

FIGS. 4a and 4b show a top down view and a circuit diagram, respectively, of an exemplary embodiment of the instant invention in an auxiliary operational mode. An operator or a controller manipulates the switching device 300 to the second or auxiliary position or mode 360, represented by switch position S2 in the circuit diagram of FIG. 4B. This electrically couples the common positive terminal 310, and thus the electrical system of the vehicle, to the positive output 210 of the auxiliary battery 200. The connection isolates the auxiliary battery 200 from the main battery 100, as the charging diode 400 prevents electrical current from the electrical system of the vehicle (not shown) from flowing into the main battery 100 while in this operating mode. Again, this circuit is significantly different from previous devices that dump the reserve battery into parallel with the discharged main battery.

These previous attempts have all disclosed applying the standby battery in parallel to the main battery. The problem with doing this is twofold. First, if there were a short or a dry cell in that main battery, that type of circuit would short the backup battery impairing its ability to start the vehicle. Moreover, even if the electrical system and main battery were in good condition, the standby battery of the prior art would be saddled with both the load of the starter and the load of the discharged battery. This weakens the standby battery taking away needed electrical power. By isolating the auxiliary battery 200 from the main battery 100 in the auxiliary mode 360, the invention permits the fully charged auxiliary battery 200 to be used independently to start the vehicle or device. Once started, the operating mode can be manipulated back into the first or main operational position 350 and the full electrical energy of the electrical system of the vehicle can be put into charging both the main battery 100 and the auxiliary battery 200. Additionally, failure to continue operating in the normal operating mode would be an indicator that a short or electrical system failure has occurred, as further described herein below.

FIGS. 5a and 5b show a top down view and a circuit diagram of an exemplary embodiment of the instant invention in a tertiary or storage operational mode. An operator or controller manipulates the switching device 300 to the tertiary, off, or storage position 370, represented by switch position S3 in the circuit diagram of FIG. 5B. This position provides for disconnection of both batteries for storage. The S3 position disconnects the main positive output 110 and the auxiliary positive output 210 from the common positive terminal 310 and, thereby, the electrical system of the vehicle or equipment. This is useful if the vehicle or equipment is being placed in storage for instance or if the battery is being stored.

Figure 6:
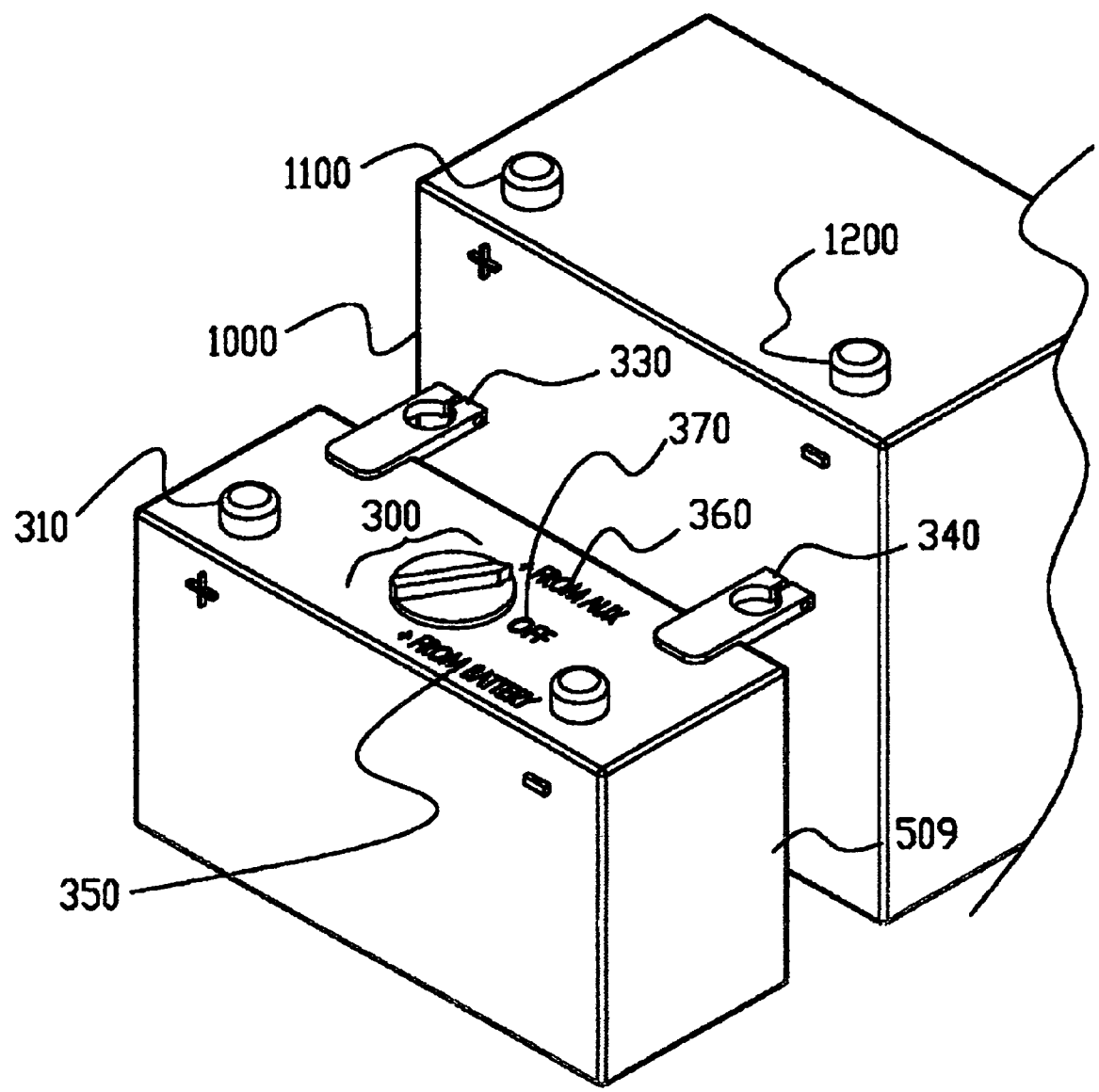
FIGS. 6 and 7 show isometric views of exemplary embodiments of the instant invention as an auxiliary battery attachment system for existing main batteries.
Figure 7:
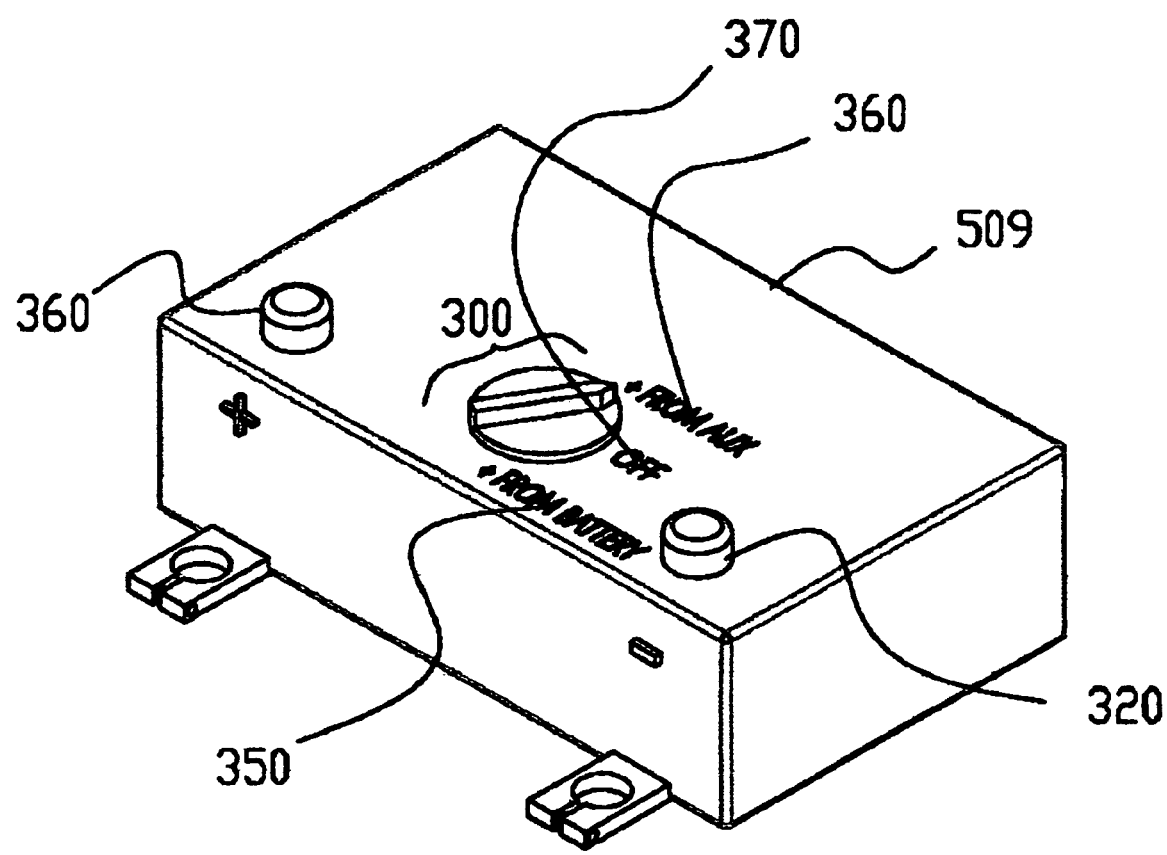

FIGS. 6 and 7 show isometric views of alternate exemplary embodiments of the instant invention employed as an auxiliary battery attachment for existing main batteries. In the further exemplary embodiment depicted in FIG. 6, the circuitry, switching device 300, and auxiliary battery 200 are provided as a "backpack" battery attachment system.

The conventional main battery 1000 does not share a common housing with the auxiliary battery 200, but instead the two are coupled through positive coupling 330 and negative coupling 340, and a common circuitry housing 509. The circuitry housing 509 is hung from the conventional main battery 1000 and its existing positive output 1100 and negative output 1200. This allows application of the invention to existing conventional batteries.

The exemplary embodiment of the attachment device shown in FIG. 6 is coupled to the existing main battery 1000 by disconnecting the electrical leads (not shown) coming from the vehicle or machinery and applying the leads to the common negative terminal 320 and common positive terminal 310 of the exemplary embodiment, located externally on the common circuitry housing 509 in the embodiment depicted. The exemplary embodiments depicted in both FIGS. 6 and 7 have the same switching device 300 as the previously discussed exemplary embodiments, but only six cells comprising the auxiliary battery 200 are enclosed within the circuitry housing 509. Auxiliary positive output 210 and auxiliary battery negative output 220 are also enclosed in the circuitry housing and electrically coupled to the common positive terminal 310 and common negative terminal 320, in a manner similar to that discussed above in the previous exemplary embodiments. The circuitry housing 509, the one-way charging circuit 400, and the switching device 300 can be provided to perform all of the same functions of the previously described exemplary embodiments of the instant invention, along with the same variations.

The exemplary embodiment shown includes a similar one-way charging circuits 400, that can include an at least one one-way charging diode or rectifier 400 and similar switched circuit configurations with positions S1, S2 and S3, as described in relation to FIGS. 3b, 4b, and 5b. Similar amperage ratings and voltages for various applications can be utilized in the exemplary embodiments of the attachment system. This provides similar functionality from the attachment system embodiments of the instant invention. The positions would include a first, main, or normal operating mode or position 350 in which the vehicle or equipment operates off the main battery 1000, which is always receiving a charge from the electrical system of the vehicle or equipment and charging the auxiliary battery 200; a secondary or auxiliary position 360, where the auxiliary battery 200 would be engaged as the sole source of electrical power for the vehicle or device; and a tertiary or storage position 370. The second or auxiliary switch position 360 would be used for emergency back up when needed to start and or operate the vehicle when the main battery 1000 is incapable of starting or operating the vehicle, equipment, or machinery. Thus the attachment device would provide a retrofit version of the instant invention, requiring no modification or conversion of existing vehicle or machinery electrical systems, while providing identical performance to the exemplary embodiments of the multiple battery system.

The shape and configuration of the exemplary embodiments of the attachment system can be varied to fit the specific space constraints of various applications. For instance the further embodiment of FIG. 7 is horizontally oriented so as to sit atop the main battery 1000 rather than hang from the side. The elements of the exemplary embodiment of the attachment device shown in FIG. 7 are similar to the exemplary embodiment of the invention shown in FIG. 6, the conventional main battery 1000 does not share a common housing with the auxiliary battery 200, but the two are coupled through a common circuitry housing 509 and couplings 330 and 340. The principal differences being that the auxiliary battery 200 and couplings 330 and 340 sit atop the main battery 1000. Additionally, as mentioned above, the location of common positive and negative terminals 310, 320, the auxiliary outputs 210, 220 and, to the extent that the existing conventional battery may allow, the main battery outputs 1100, 1200, the type of switching device 300 and the voltage rating of the auxiliary battery 200 can be varied without departing from the spirit of the invention.

Figure 8A:
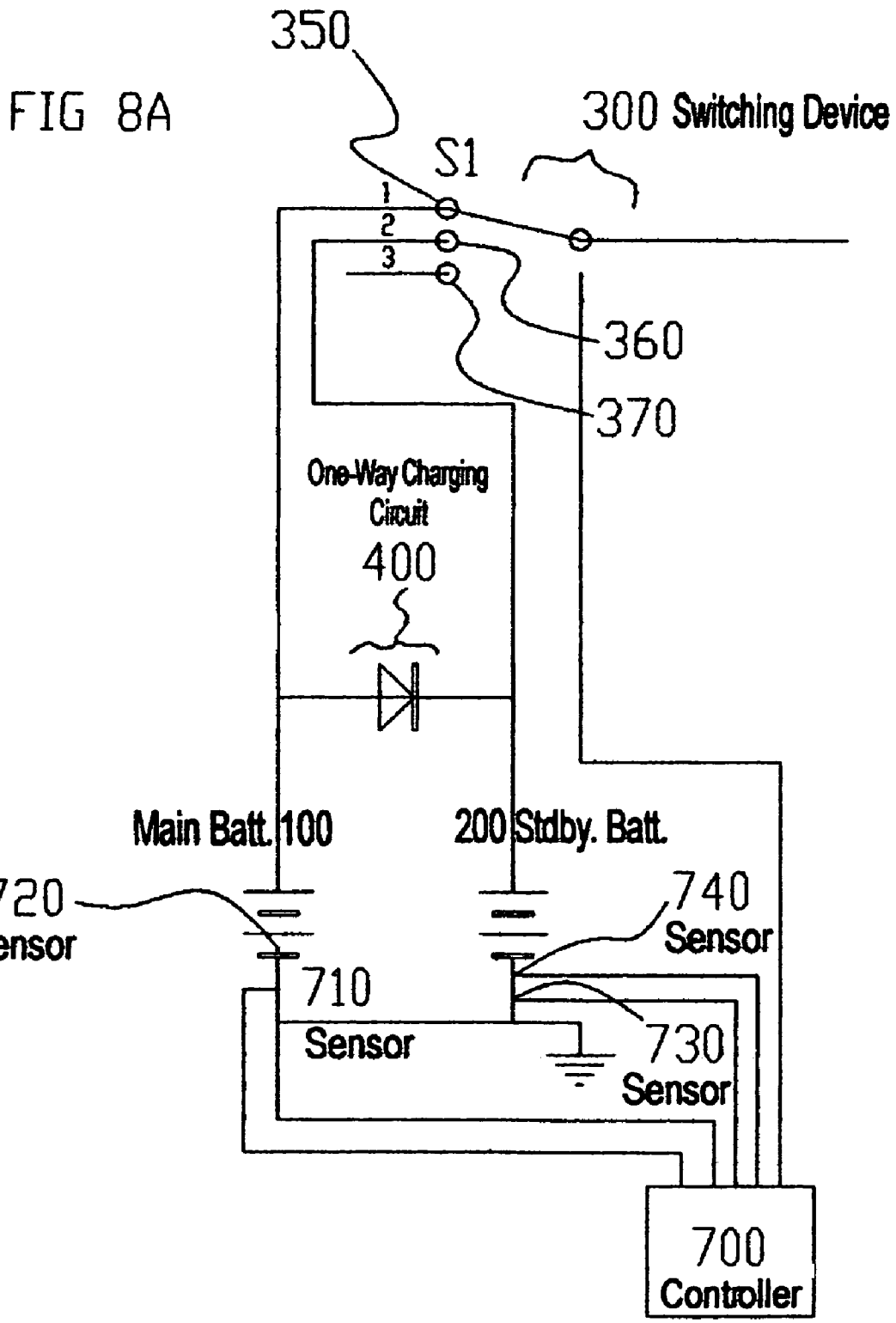
FIG. 8A shows a circuit diagram of an exemplary embodiment of the instant invention incorporating an automated controller.

FIG. 8A shows a circuit diagram of an exemplary embodiment of the instant invention incorporating an automated controller. In addition to the switching device 300 and circuitry disclosed previously, an additional control system is provided for automated control of the invention. A controller 700 is provided, this can for instance be, but is not limited to, a microprocessor. The controller 700 is coupled to the at least one sensor in the battery system to sense the condition of at least one of the batteries through these connections.

The controller 700 monitors and detects various operating conditions of the batteries through the at least one sensor. The at least one sensor can include, but is not limited to, any of an at least one main battery, an at least one auxiliary battery, and at least one switch sensor or any additional sensors that may be appropriate. The controller 700 can continuously or selectively monitor for example, but not limited to, any of the following parameters with any of the at least one main, auxiliary, or switch sensors: the auxiliary battery voltage, the main battery voltage, the auxiliary battery amperage, the main battery amperage, temperature, vibration, current, the switch state, the switch position, and the condition of various flags and various timers within the system or similar parameters. In the exemplary embodiment of FIG. 8A, an at least one main battery sensor is provided. The at least one main battery sensor is shown as two main battery sensors 710,720. These measure the voltage through main battery sensor 710 and the amps through main battery sensor 720 of the main battery 100. Also in the exemplary embodiment shown, an at least one auxiliary battery sensor is provided. The at least one auxiliary battery sensor is shown as two auxiliary sensors 730, 740. These measure the voltage, through auxiliary sensor 730, and the amperage, through auxiliary sensor 740, of the auxiliary battery 200. Additionally in the exemplary embodiment of FIG. 8B, an at least one switch position sensor 750 can be provided to sense the position and condition of the switching device 300.

In each case the sensors 710-750 communicate with the controller 700 providing various parameter inputs. Upon detecting parameter inputs that match pre-programmed conditions, set through flags, triggers, timers and other common control elements, the controller 700 sends a signal to switching device 300 to change the state of the switching device 300. The controller 700 then verifies the result of the change of state. The switching sensor 750 is connected to the controller 300 to relay relevant data on the switching device.

FIG. 8B shows a circuit diagram of yet a further embodiment of the instant invention. In this further embodiment of the instant invention an indicator element 775 is utilized in conjunction with an automatic a controller 700 that provides fully automated functionality in the switching of the instant invention. In this embodiment, the at least one sensor includes a main battery sensor 710 and an auxiliary batter sensor 740 for sensing the condition of both batteries, respectively. In the exemplary embodiment, the automatic controller 700, through the main battery sensor 710, poles the main battery 100 to determine its condition. Polling can also be done at the auxiliary battery or simultaneously at either battery. If the automatic controller 700 determines that an abnormal discharge condition exists, the indicator element 775 is activated to indicate the abnormal condition. The controller 700 automatically switches the switching device element 300 from a first operating position S1, in which the main battery 100 is coupled to the electrical system and the auxiliary battery 200 is coupled to the electrical system through a one-way charging diode 400, to a second operational position S2, where the main battery 100 is uncoupled from the electrical system and the auxiliary battery 200 is coupled to the electrical system in a manner that bypasses the one-way charging diode 400.

In the exemplary embodiment shown, the controller 700 then monitors the condition of the auxiliary battery 200 through the at least one sensor, for instance the auxiliary battery sensor 740 in FIG. 8B. Once a sufficient charge to recharge the main battery 100 has been detected by the auxiliary battery sensor 740, coming for example from the alternator or other electrical generation devices in the electrical system, the automatic controller 700 switches the system back to its first operating mode S1 and both batteries are simultaneously charged. As part of the at least one sensor, additional sensors or sensors in other parts of the electrical system can monitor and report to the controller as well. These help to confirm the restoration of normal operations.

In the exemplary embodiment shown, if a fault/no charge condition is detected from the electrical system, the auxiliary battery sensor 740 will send this information to the automatic controller 700 and the controller 700 will then provide an indicator warning, for example through the at least one indicator element 775, for an operator. The indicator element 775 can be visually based, or audibly based or both. It can be for example, but is not limited to, a klaxon, a horn, a light, a plurality of lights, an LCD panel, a simulated human voice, a human voice, a light emitting diode, a plurality of light emitting diodes, or other suitable indicator. The at least one indicator element 775 can be activated to provide an alert and/or provide notice of any or all battery conditions, an electrical system failure, or any other condition or state of the electrical system and/or the instant invention. This alert allows for the appropriate action to be taken in seeking assistance if a fault condition exists, as explained in relation to the methods described below.

FIG. 8C shows an electrical schematic of a still further embodiment of the instant invention. In the embodiment of FIG. 8C the charging circuit includes an at least on Silicon Controlled Rectifier (SCR) 4000 to provide added safety and longevity for the auxiliary battery 200. The embodiment utilizes a configuration similar to that of FIG. 8B, save for the use of the SCR 4000. The SCR 4000 communicates with the controller 700. The at least one sensor includes auxiliary sensor 740. If the auxiliary battery 200 is being overcharged, based on the auxiliary sensor 740 input, the SCR 4000 as part of the charging circuit can be shut down by the controller 700 effectively shutting off the circuit pathway to the auxiliary battery 200, thus uncoupling the auxiliary battery 200 from the system in a controlled manner. This provides an additional factor of safety by preventing overcharge of the auxiliary battery 200 in the exemplary embodiment disclosed. Allowing for shutdown if an overcharge condition exists also improves the longevity of the auxiliary battery 200.

FIG. 9 shows circuit diagram for an auxiliary battery discharge cycling system for a still further exemplary embodiment of the instant invention. The still further embodiment of the instant invention is provided that includes an auxiliary battery discharge cycling system 800. This discharge cycling system can, for instance, be included as an automated auxiliary battery discharge cycling system, as shown in the exemplary circuit diagram of FIG. 9. In other non-limiting examples of exemplary embodiments, the discharge cycling system can be incorporated as part of the controller 700 shown in FIG. 8 or as a separate manual discharge unit or through simple instructions to the operator to periodically run the vehicle in the second or auxiliary operational setting in an auxiliary setting for a short period of time.

The auxiliary battery discharge cycling system 800 would operate to ensure the longevity of the auxiliary battery 200 by periodically engaging the auxiliary battery 200 to start and/or operate the vehicle or equipment. Such a system can include a timer 820 coupled to a switching device 300, the timer 820 periodically activating the switching device 300 which in turn switches the system to the auxiliary operational mode 360 for a short period of time, as described above in relation to FIGS. 4a and 4b. The system would operate to periodically provide for a slight discharge the auxiliary battery 200 in the auxiliary-operating mode 350. By providing for a slight discharge, the auxiliary battery 200 would be lower than its peak voltage and would then need to be recharged by the battery system in its first or normal operating mode, as described above. This would help extend the life of the auxiliary battery by maintaining the condition of the electrodes and keeping the electrolytic solution active. The exemplary embodiments employing the auxiliary battery discharge cycling system 800 in its various forms would only operate for a short period of time so as not to accidentally run down the auxiliary battery 200.

The instant invention also acts as a discharge condition indicator. If an operator were to utilize the auxiliary battery 200 to start the vehicle or machinery, they would switch to the auxiliary circuit position 360 or S2 in the circuit diagrams. Once the vehicle started the user would return the switching device 300 to the normal or main operating position 350, engaging the circuit associated with the normal operating position, in order to charge both batteries to full capacity. If upon returning the switching device 300 to the normal operating position 350 the engine were to stop running, it would indicate a general operating failure in the electrical system, for instance a bad alternator or generator. At this point the operator would be able to return the switching device 300 to the auxiliary position 360 and engage the auxiliary battery 200 to supply the needed energy to start and run the vehicle or equipment from the auxiliary battery 200 allowing a certain amount of operating time, depending on the application, to obtain service. Thus the system allows for increased safety for a traveler, giving sufficient time, for instance, to get a car off the road and home or to a service station.

Figure 10A:
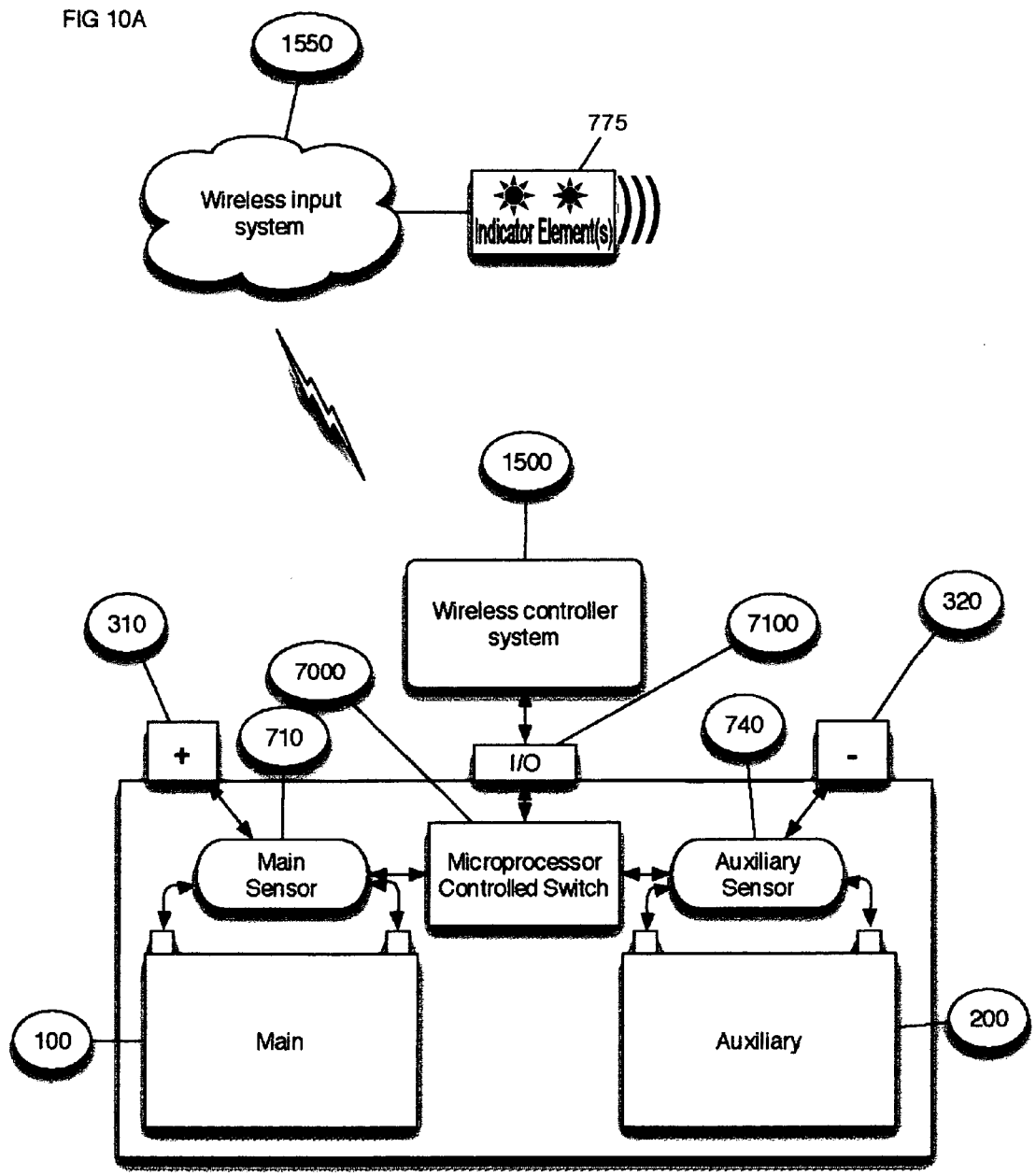
FIG. 10A shows a component diagram of a still further exemplary embodiment of the instant invention incorporating a wireless interface and wireless control input.

FIG. 10A shows a component diagram of a still further exemplary embodiment of the instant invention incorporating a wireless interface and wireless control input. In addition to the switching device 300 and circuitry disclosed in any of the previous embodiments, an additional wireless control system 1500 is provided in this embodiment. The wireless control system 1500 may comprise, but is not limited to, one or more of the following: an at least one microprocessor, a signal transmitter, a signal receiver, a security protocol/encryption element, an indicator element and other typical control elements. The wireless control system 1500 is coupled to electrical control circuit having the microprocessor controlled switching device 7000 with an at least two operating positions and includes an at least one sensor to sense the condition of at least one of the batteries.

In the exemplary embodiment of FIG. 10A, the wireless controller system 1500 monitors and detects various operating conditions of the batteries through the at least one sensor. The at least one sensor can include, but is not limited to, any of an at least one main battery, at least one auxiliary battery, and an at least one switch sensor and/or any additional sensors. The at least one sensor can also include any of the previously disclosed sensors or other sensors coupled to the electrical system (not shown) for sensing the condition of the electrical system. The wireless controller system 1500, through the at least one sensor monitors the condition of the instant invention and the battery system. The wireless controller system 1500 can for example continuously monitor, but is not limited to, any of the following parameters with any of the at least one sensors: the auxiliary battery voltage, the main battery voltage, the auxiliary battery amperage, the main battery amperage, temperature, vibration, current, the switch state, the switch position, and the condition of various flags and various timers within the system.

In the exemplary embodiment of FIG. 10A, the at least one sensor is shown as a main battery sensor 710 and an auxiliary battery sensor 740 that are provided to monitor the respective batteries. These sensors can for instance be, but are not limited to, VI sensors. The microprocessor controlled switch 7000 and the main and auxiliary battery sensors 710, 740 are coupled to the wireless controller 1500 through an Input/Output (I/O) bus 7100. The automatically controlled microprocessor switch 7000 is actuated by the wireless controller system 1500 in response to input from a wireless input device 1550, as further described below.

In the exemplary embodiment shown, once the wireless controller system 1500 senses a lower than required main battery parameter, a signal is sent wirelessly or via a conventional electrical coupling to an at least one indicator element 775, for example a light emitting diode (LED). The at least one indicator element 775 may be coupled via a terrestrial coupling, for instance through a wire to an LED in a vehicle dashboard. Alternatively and as shown in FIG. 10A, the indicator element 775 can be wirelessly coupled to the control system 1500, for instance by providing a transceiver in a wireless input device 1550 as shown in the exemplary embodiment of FIG. 10A, where the indicator element 775 is an LED mounted on a key fob housing. In the exemplary embodiment of FIG. 10A, with the wireless input device 1510 having a transceiver, a signal is transmitted from the wireless control system 1500 to the wireless input device 1510 the input device transceiver mounted within the wireless input device 1550, here the key fob, which turns the indicator element 775, an LED light, on. Although an LED light is specifically mentioned, any of the indicator elements previously discussed or other appropriate indicating devices may be used. An alert is thus provided and appropriate actions may then be taken to save power until the auxiliary battery 200 is required.

The auxiliary battery 200 can be engaged immediately or when power is required. In the exemplary embodiment of FIG. 10A, this is accomplished through the transceiver within the wireless input device 1510 that is activated, in this case a key fob with may also have a button that, once depressed, sends a signal to the wireless controller system 1500. The wireless controller 1500, signals the microprocessor controlled switching device 7000 to switch from normal operating mode S1 to auxiliary operating mode S2, isolating the main battery 100 and engaging the auxiliary battery 200.

After the requirement for the auxiliary battery 200 has passed, the wireless controller 1500 continues to monitor the system through one of the at least one sensors, in this instance auxiliary battery sensor 740. It monitors the auxiliary battery 200 condition to detect whether it is being recharged. If a recharge condition is sensed, the wireless controller system 1500 instructs the microprocessor controlled switching device 7000 to switch back to a normal operating mode S1 and sends a signal to the indicator element 775, turning it off. If an abnormal recharge condition or no recharge is sensed, the wireless controller 1500 can activate the at least one indicator element 775 to provide a second alert indicating an electrical fault condition. It can then switch to auxiliary mode and allow for the necessary service(s) to be obtained for the system.

Figure 10B:
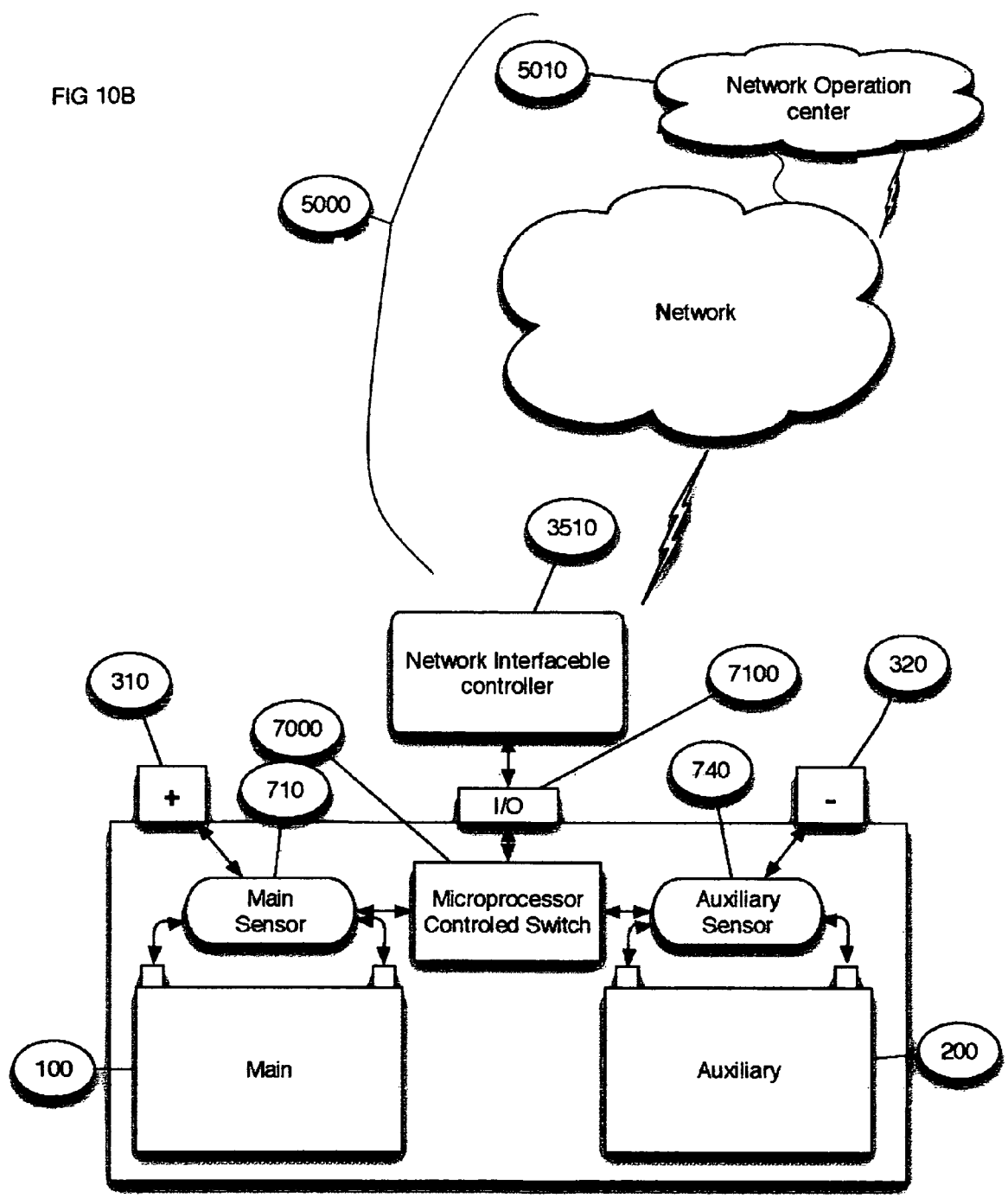
FIG. 10B shows a component diagram of a yet another exemplary embodiment of the instant invention incorporating a network interfaced controller and network.

FIG. 10B shows a component diagram of a yet another exemplary embodiment of the instant invention incorporating a network interfaced controller and network. In referring to this exemplary embodiment and other exemplary embodiments, a "controller" or "network interfaceable controller" refers to any apparatus that is capable of accepting a structured input, processing the structured input according to prescribed rules, and producing results of the processing as output. The output may or may not affect the operation of other devices. Examples of a controller include: a microprocessor, a programmable logic chip, a digital signal processor, a microcontroller, a computer; a general purpose computer; a supercomputer; a mainframe; a super mini-computer; a mini-computer; a workstation; a micro-computer; a server; an interactive television; and any a hybrid combination of a computer and an interactive television. A controller also refers to two or more controllers or computers connected together via a network for transmitting or receiving information between the computers. An example of such a network interfaceable controller includes a distributed control system for processing information via computers linked by a network.

A "network" refers to a number of controllers, computers, programmable logic devices, and/or network controllers and associated devices that are connected by a communication system and communication facilities to allow for communication. A network may involve permanent connections such as cables or other terrestrial components or temporary connections such as those made through telephone, satellite, cellular systems, radio frequency transceivers, or other wireless communication links. Examples of networks include: a cellular communications network, radio frequency networks, wireless data networks, an internet—such as the Internet; an intranet, a local area network (LAN); a wide area network (WAN); a controller area network (CAN), local interconnect network (LIN) and a combination of networks, such as an internet and an intranet. This includes specialized data monitoring networks, such as ONSTAR and similar services.

FIG. 10B shows a component diagram for an exemplary embodiment of the instant invention utilizing a network interface. A network interfaceable controller 3510 polls the condition of its sensors. The network interfaceable controller 3510 is coupled to the battery system via an I/O port 7100. The I/O port 7100 is robust, with sufficient carrying capacity to provide a full data stream to and from all of the sensors. The network interfaceable controller 3510 may regularly or selectively report conditions via a network 5000, for instance a satellite network or terrestrial cellular network, to a Network Operation Center (NOC) 5010. The NOC 5010 monitors the condition of the sensed parameters of the network interface 3510, including the battery system condition. If the condition of the main battery 100, as measured by any appropriate parameters and sensed by an at least one sensor, falls below set parameter(s) an indicator alert is triggered and/or sent to the NOC 5010 via network 5000.

Appropriate actions are taken to conserve power and notify the operator of the steps taken. For instance, all non-essential auxiliary electric devices may be shut down by the NOC 5010. The NOC 5010, either after a response from an operator or upon its own volition, can switch the battery to the auxiliary battery 200 through switch position S2 to facilitate the power requirements of the electrical system. The operator or the NOC 5010 can then confirm a satisfactory battery system condition. Alternatively, if used in a switched network of batteries, such as in solar generation systems, verification can be used in setting the charging status of the system or in determining appropriate service needed for such an application.

In the exemplary embodiment shown, the NOC 5010 or the network interfaceable controller 3510 allows the auxiliary battery 200 to continue to discharge while sensing output from a recharging device (not shown), for example an alternator, to the switched controller 5010 through the at least one sensor. Based on the sensed output from the recharging device, the NOC 5010 can then switch the battery to the normal operating position S1 and allow for normal operation S1 or, if the alternator output is abnormal, the NOC 5010 can alert the operator to the electrical fault condition in the electrical system and return to the auxiliary operating position S2.

Figure 11A:
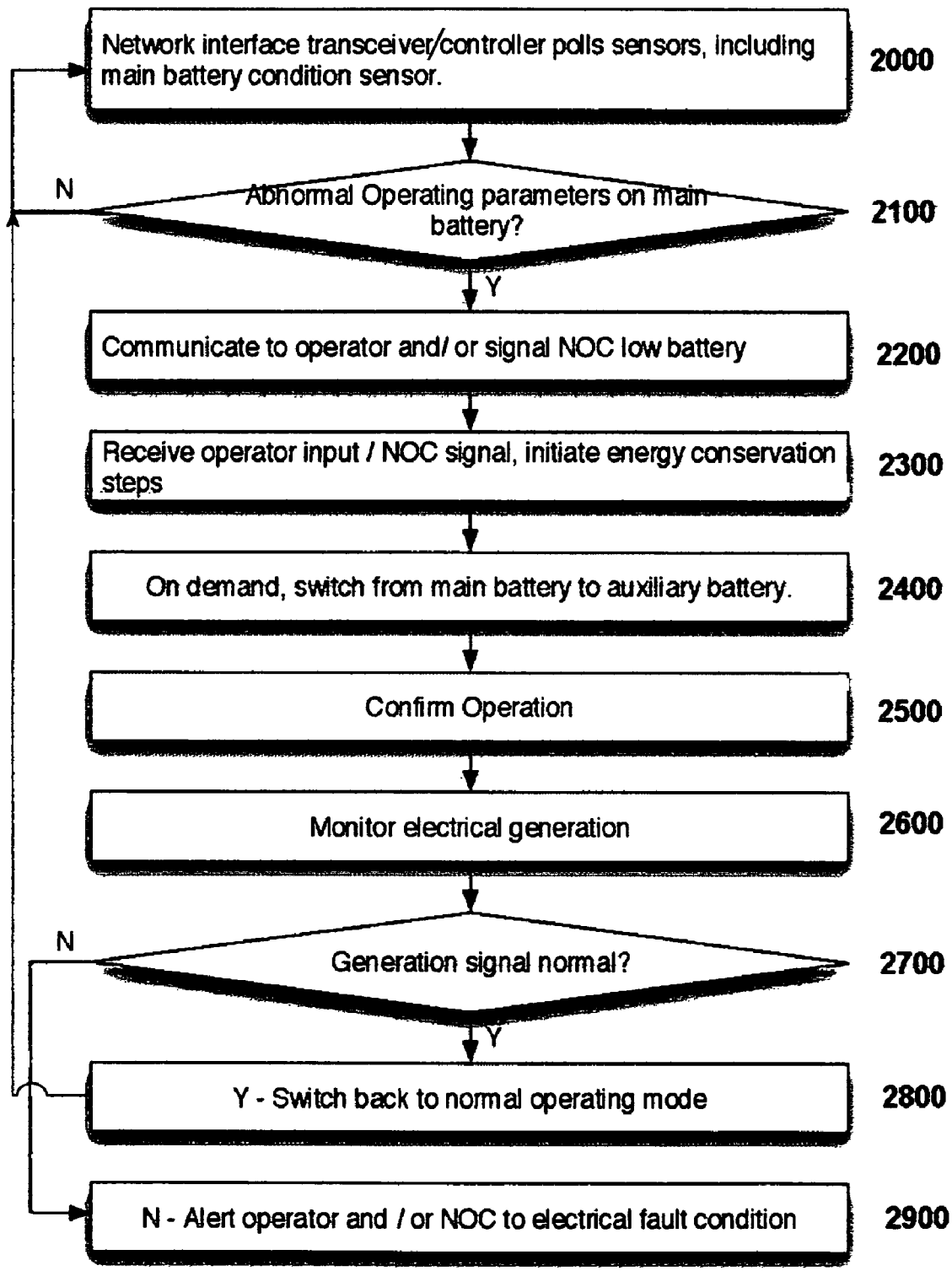
FIG. 11A shows a flow chart of the operational steps for an exemplary embodiment of the controller in the instant invention.

FIG. 11A shows a flow chart of the operational steps for an exemplary embodiment of the controller in the instant invention. In step 2000, the controller, wireless controller, or network interfaced controller polls the at least one sensor to determine the condition of a main battery. In step 2100, a decision is made via the processing logic to determine if an abnormal operating parameter(s) is being reported on the main battery. If no abnormal operating parameters are present, the next step follows the negative branch of the decision loop and returns to step 2000. The repetition may include a delay between successive polling steps 2000 or additional sensing steps for additional sensors. In the operation of the exemplary embodiment of the invention with a network interfaced controller described in FIG. 11A, the network interfaced controller can also immediately report or periodically report the normal operating status that is a result of the polling step 2000 via the network to the NOC. However, if an abnormal operating parameter is identified, the process moves along the affirmative branch of the decision loop to step 2200. At step 2200, the controller signals the operator or transmits to the NOC that an abnormal battery condition, for instance a low battery voltage, has been detected.

A confirmation signal is returned to the controller and received in step 2300 and the controller, the NOC, or the operator initiates energy conservation steps. For instance, if the instant invention is used in a vehicle with headlights or similar lighting, this lighting could be turned off by the operator or remotely by the network. The invention may report these conservation steps to an operator, either immediately or upon the arrival of the operator at the system site.

In step 2400 the controller, network interfaced controller, or wireless controller activates the switching device, for instance a microprocessor controlled switch, to switch the system from a first operational mode with the main battery engaged by the electrical system to an auxiliary operational mode, with the auxiliary battery being engaged by the electrical system and the main battery being isolated.

The system then confirms normal operation in step 2500. The controller then monitors the electrical generation of the system in step 2600. The controller analyzes the output of the generation and decision is made in step 2700. If the generation parameters are normal, the controller can switch the switching device back to a main operational mode and engage the main battery in step 2800. If an abnormal generation parameter(s) is detected, an alert is sent to the operator and/or the NOC 5010 to indicate an electrical fault condition in step 2900

Figure 11B:
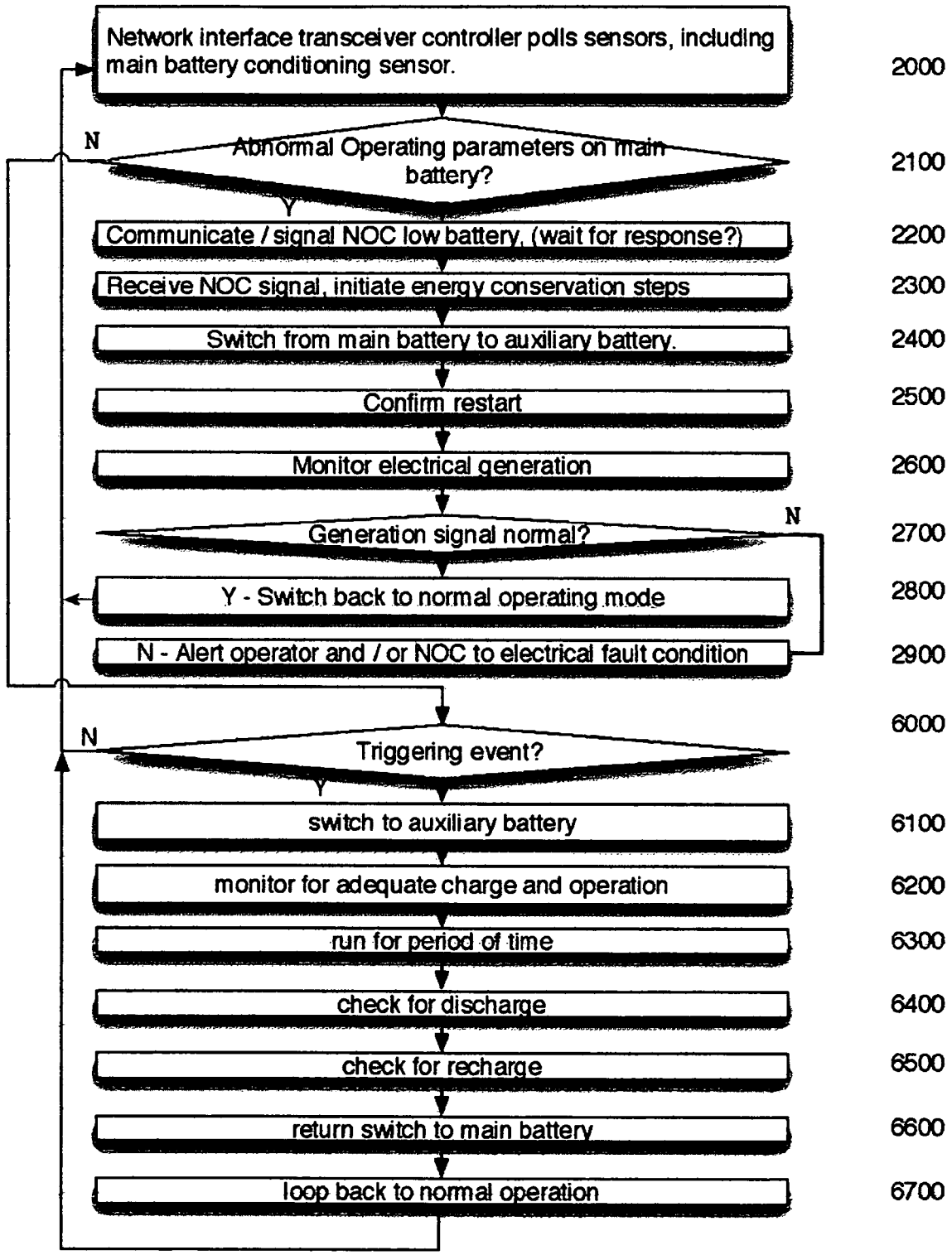
FIG. 11B shows a flow chart of the operational steps for a further exemplary embodiment of the controller in the instant invention including auxiliary battery maintenance steps.

FIG. 11B shows a flow chart of the operational steps for the controller in the instant invention including an automatic cycling method for cycling the auxiliary battery. In this additional method of operation, the automatic controller provides for a cycling routine to keep the auxiliary battery in good condition. Steps 2000-2900 are identical to those previously discussed in relation to FIG. 11A, except that if normal operating parameters result in the polling step 2000, then an additional decision step 6000 is made for a triggering event for the cycling method steps. The triggering even may be based on operational parameters of the electrical system or on mileage or on time in service.

If no triggering event has occurred, then the negative branch is followed and the controller loops back to step 2000. If a triggering even is found, the controller at step 6100 switches the switching device into the auxiliary operating mode at S2 and switch to the auxiliary battery, as discussed previously. At step 6200, the controller then monitors for adequate charge and operation of the auxiliary battery. The system then continues to step 6400, running the electrical system on the auxiliary battery. At method step 6500, the system checks discharge level of the auxiliary battery. After checking for discharge, the controller at step 6500 checks for the recharge of the auxiliary battery. The amount of recharging can be set by the controller for a predetermined time or amount of energy. After recharging battery at step 6500, the system switches back to a normal operating position at step 6600. The controller then loops back to the polling step 2000 and begins the method again.

The embodiments and examples discussed herein are non-limiting examples. The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A remotely controllable multiple battery system for reliably supplying electrical energy to a vehicle electrical system, the remotely controllable multiple battery system receiving control signals from a remote control device, the remotely controllable multiple battery system comprising:
   a main battery;
   at least one sensor operable to sense at least one operating condition of the main battery and produce at least one output based on the at least one operating condition of the main battery;
   at least one auxiliary battery;
   at least one controllable switching device coupled to the main battery and the at least one auxiliary battery, the at least one controllable switching device being responsive to at least one control signal to engage one of the main battery and the at least one auxiliary battery to solely supply electrical energy only to the vehicle electrical system such that the main battery and the at least one auxiliary battery never supply electrical energy to the vehicle electrical system simultaneously while the vehicle is in operation; and
   a controller in communication with the remote control device and coupled to the at least one sensor and the at least one controllable switching device, the controller operable to monitor the at least one output of the at least one sensor and provide an indication of the at least one operating condition to the remote control device, the controller further operable to receive the at least one control signal from the remote.

2. The remotely controllable multiple battery system of claim 1, wherein the controller comprises a network interfaceable controller operable to communicate over a network.

3. The remotely controllable multiple battery system of claim 2, wherein the remote control device is a network operation center.

4. The remotely controllable multiple battery system of claim 1, wherein the controller comprises a wireless system controller operable to communicate over a wireless link.

5. The remotely controllable multiple battery system of claim 4, wherein the remote control device comprises a wireless input device.

6. The remotely controllable multiple battery system of claim 1, further comprising:
   a one-way charging circuit configured to facilitate charging of and prevent current flow from the at least one auxiliary battery at all times during which the main battery is supplying electrical energy to the vehicle electrical system.

7. The remotely controllable multiple battery system of claim 6, wherein the one-way charging circuit includes at least one one-way charging diode.

8. The remotely controllable multiple battery system of claim 7, wherein the at least one one-way charging diode comprises at least one Silicon Controlled Rectifier (SCR).

9. The remotely controllable multiple battery system of claim 8, wherein the least one sensor is further operable to sense at least one operating condition of the at least one auxiliary battery and produce at least a second output based on the at least one operating condition of the at least one auxiliary battery and wherein the controller controls the at least one Silicon Controlled Rectifier (SCR), responsive to the at least one control signal, to prohibit electrical charge from reaching the at least one auxiliary battery if the at least a second output of the at least one sensor indicates an over charge condition in the auxiliary battery.

10. The remotely controllable multiple battery system of claim 1, wherein the at least one controllable switching device has at least two operating positions, a first operating position of the at least two operating positions coupling a positive output of the main battery to the electrical system while de-coupling a positive output of the at least one auxiliary battery from the electrical system and a second operating position of the at least two operating positions coupling the positive output of the at least one auxiliary battery to the electrical system while de-coupling the positive output of the main battery from the electrical system.

11. The remotely controllable multiple battery system of claim 1, further comprising the remote control device and at least one indicator element coupled to the remote control device, the at least one indicator element operable to indicate an undesired operating condition of the main battery based on the indication of the at least one operating condition received from the controller.

12. The remotely controllable multiple battery system of claim 11, wherein the at least one indicator element has at least one light emitting diode of at least one color.

13. The remotely controllable multiple battery system of claim 11, wherein the at least one indicator element comprises a plurality of indicator elements having at least one of a red, an orange, a green, and an amber color.

14. The remotely controllable multiple battery system of claim 11, wherein the at least one indicator comprises at least one of a klaxon, a horn, at least one incandescent light, an LCD panel, a simulated human voice, and an actual human voice.

15. The remotely controllable multiple battery system of claim 1, wherein the controller includes at least one microprocessor, at least one signal transmitter, at least one signal receiver, a security protocol/encryption element, an indicator element, an input/output bus.

16. The remotely controllable multiple battery system of claim 1, wherein the at least one sensor comprises at least one VI sensor.

\* \* \* \* \*